United States Patent
Maniwa et al.

(10) Patent No.: US 11,927,958 B2
(45) Date of Patent: Mar. 12, 2024

(54) AUTOMATIC TRAVELING VEHICLE AND STORAGE FACILITY THEREOF

(71) Applicant: TOYOTA JIDOSHA KABUSHIKI KAISHA, Toyota Aichi-ken (JP)

(72) Inventors: Yuta Maniwa, Susono Shizuoka-ken (JP); Tetsuya Kanata, Susono Shizuoka-ken (JP); Yozo Iwami, Susono Shizuoka-ken (JP); Yuhei Katsumata, Fuji Shizuoka-ken (JP); Daisaku Honda, Nagoya Aichi-ken (JP); Saki Narita, Toyota Aichi-ken (JP); Hideki Fukudome, Toyota Aichi-ken (JP); Takuya Watabe, Hachioji Tokyo-to (JP); Naoko Ichikawa, Toyota Aichi-ken (JP); Yuki Nishikawa, Susono Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 17/486,063

(22) Filed: Sep. 27, 2021

(65) Prior Publication Data
US 2022/0107639 A1 Apr. 7, 2022

(30) Foreign Application Priority Data
Oct. 2, 2020 (JP) .................................. 2020-168037

(51) Int. Cl.
| B62D 21/05 | (2006.01) |
| B60W 60/00 | (2020.01) |
| E04H 6/02 | (2006.01) |
| G05D 1/00 | (2006.01) |

(52) U.S. Cl.
CPC ........... *G05D 1/0088* (2013.01); *B60W 60/00* (2020.02); *B62D 21/05* (2013.01); *E04H 6/02* (2013.01);
(Continued)

(58) Field of Classification Search
CPC .. G05D 1/0088; G05D 1/0094; G05D 1/0214; G05D 1/0297; G05D 1/0225;
(Continued)

(56) References Cited

U.S. PATENT DOCUMENTS

| 8,288,989 B2 * | 10/2012 | Baba ....................... B66F 9/063 414/268 |
| 10,197,999 B2 * | 2/2019 | Doane ..................... G01C 21/20 |

(Continued)

FOREIGN PATENT DOCUMENTS

| CN | 207015384 U | 2/2018 |
| JP | 2001-071807 A | 3/2001 |

(Continued)

*Primary Examiner* — Keith J Frisby
(74) *Attorney, Agent, or Firm* — Dinsmore & Shohl LLP

(57) ABSTRACT

An automatic traveling vehicle includes a vehicle structure including a first top plate, and an electronic control unit. The electronic control unit is configured to execute a storage mode when a storage execution condition is satisfied. The storage mode includes a storage posture formation process of causing the vehicle to automatically travel so as to take a predetermined storage posture together with a counterpart automatic traveling vehicle. In the storage posture, the vehicle is in a superposition state in which the vehicle overlaps with the counterpart vehicle in a plan view, or a parallel state in which the vehicle is lined up with the counterpart vehicle while the first top plate and a second top plate of the counterpart vehicle are standing and facing each other so as to be parallel to or substantially parallel to a vertical direction.

12 Claims, 14 Drawing Sheets

(52) U.S. Cl.
CPC ......... *G05D 1/0094* (2013.01); *G05D 1/0214* (2013.01); *G05D 1/0225* (2013.01); *G05D 1/0278* (2013.01); *G05D 2201/0212* (2013.01); *G05D 2201/0216* (2013.01)

(58) Field of Classification Search
CPC ......... G05D 1/0278; G05D 2201/0212; G05D 2201/0216; B62D 21/05; B60W 60/00; E04H 6/02
USPC ........................................................ 180/208
See application file for complete search history.

(56) References Cited

U.S. PATENT DOCUMENTS

| | | | |
|---|---|---|---|
| 11,524,591 B2* | 12/2022 | Barbosa, Jr. | B62J 17/02 |
| 11,586,223 B2* | 2/2023 | Iwasaki | G08G 1/202 |
| 2018/0101179 A1* | 4/2018 | Louey | B60L 50/51 |
| 2018/0158018 A1* | 6/2018 | Luckay | G05D 1/0027 |
| 2019/0243383 A1* | 8/2019 | Cantrell | B66F 9/12 |
| 2020/0175471 A1* | 6/2020 | Tsuruta | B64C 39/024 |
| 2021/0070339 A1* | 3/2021 | Delgatty | B60R 25/24 |

FOREIGN PATENT DOCUMENTS

| | | |
|---|---|---|
| JP | 2006-082774 A | 3/2006 |
| JP | 2010-017428 A | 1/2010 |
| JP | 2017-226370 A | 12/2017 |
| JP | 2018-122830 A | 8/2018 |
| JP | 2018-122993 A | 8/2018 |
| WO | WO-2020192421 A1 * | 10/2020 |

\* cited by examiner

Vehicle Front-Rear Direction

Vehicle Front-Rear Direction

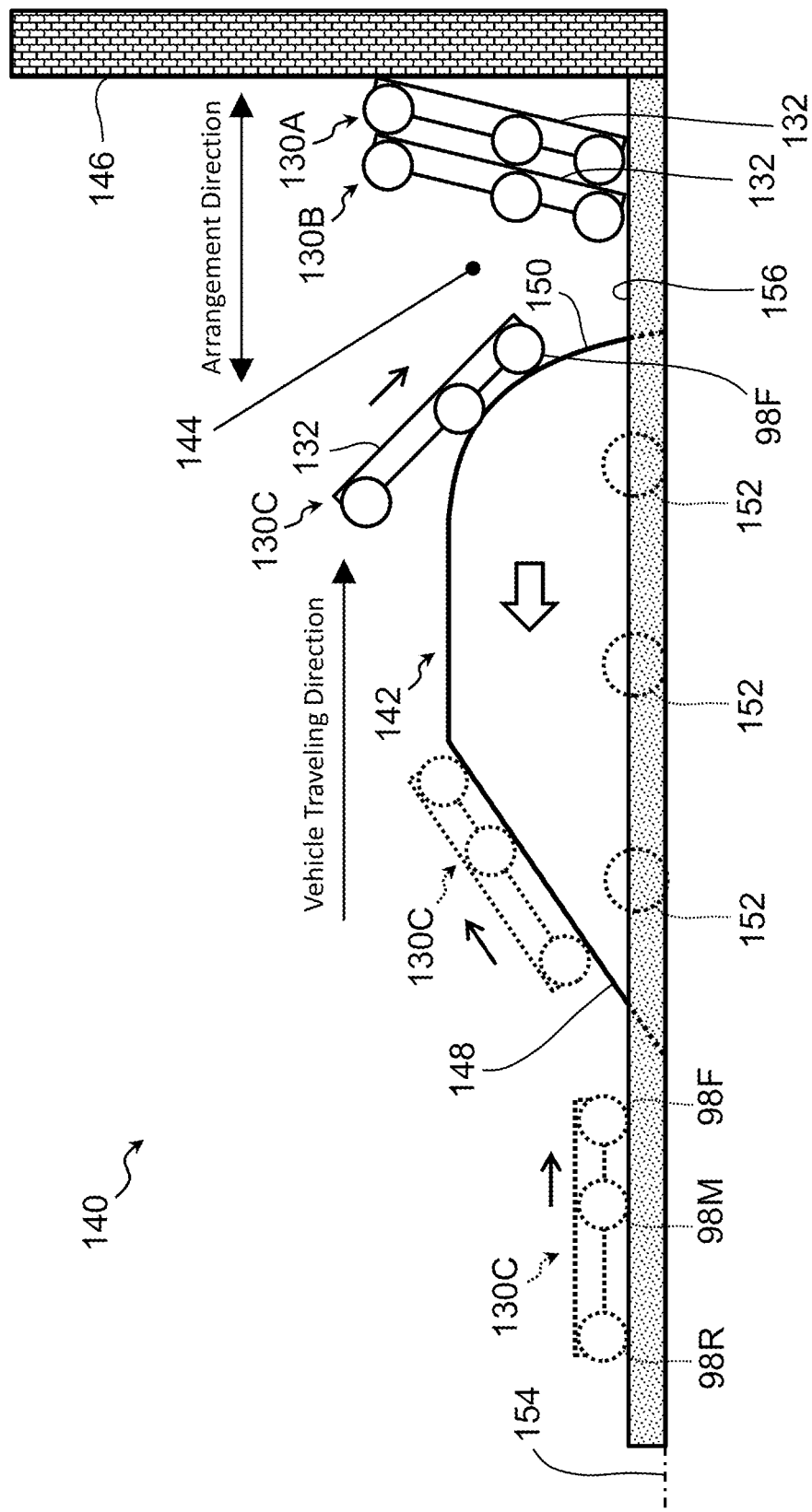

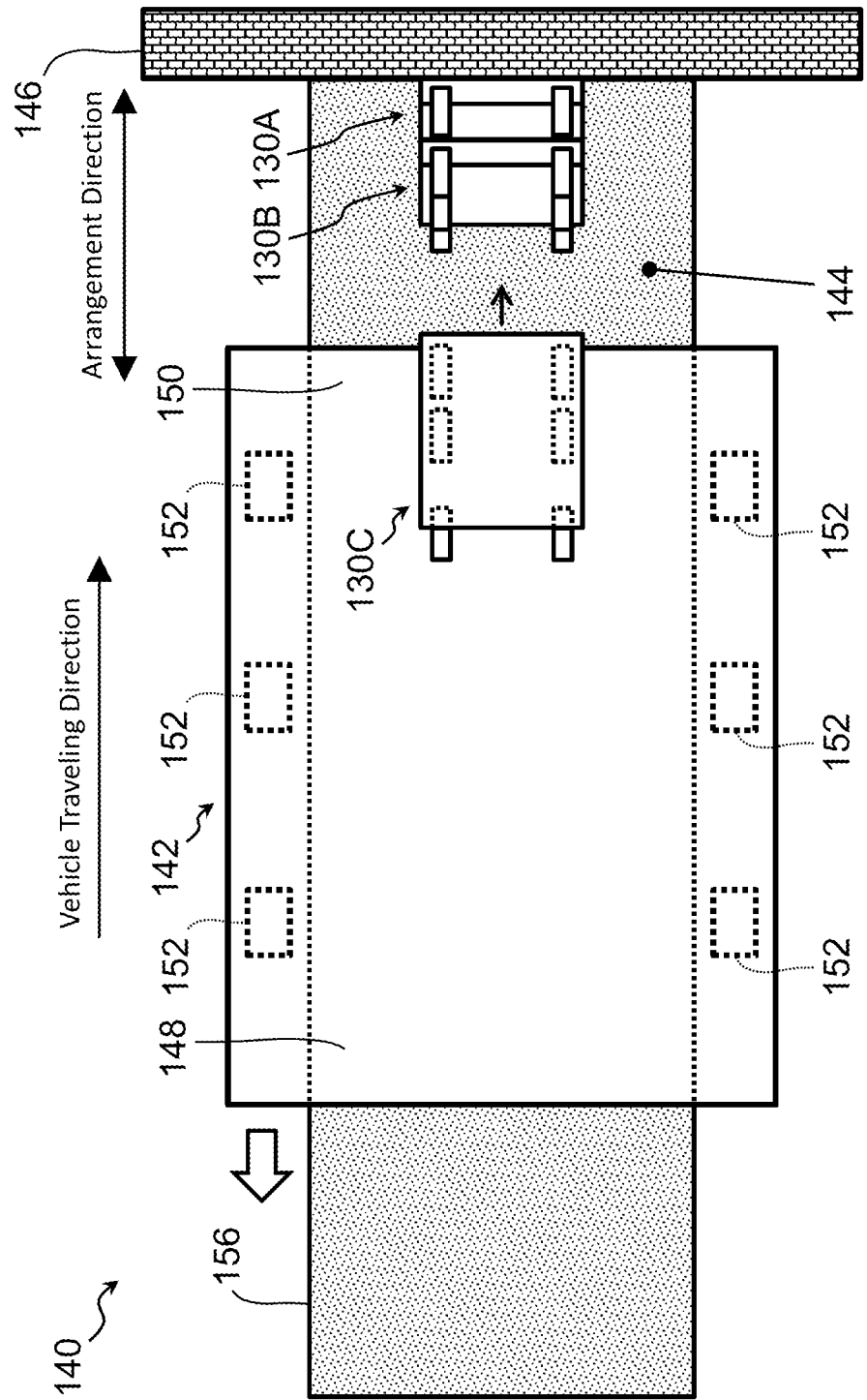

AUTOMATIC TRAVELING VEHICLE AND STORAGE FACILITY THEREOF

CROSS-REFERENCE TO RELATED APPLICATION

The present disclosure claims priority under 35 U.S.C. § 119 to Japanese Patent Application No. 2020-168037, filed on Oct. 2, 2020, which is incorporated herein by reference in its entirety.

BACKGROUND

Technical Field

The present disclosure relates to an automatic traveling vehicle and a storage facility thereof, and more particularly to an automatic traveling vehicle provided with a vehicle structure including a top plate having an upper surface configured for a user to ride on or configured for a luggage to be placed on, and a storage facility thereof.

Background Art

JP 2017-226370 A discloses a vehicle that provides a ride share service. This vehicle is equipped with a desk that allows a ride share passenger to communicate with other ride share passengers to the desired degree.

SUMMARY

When a plurality of automatic traveling vehicles are used to provide a service for moving people or luggage, a large space for storing the plurality of automatic traveling vehicles is required. For this kind of problem, if the automatic traveling vehicle itself can take a storage posture that can reduce the storage space by using an automatic traveling function, the storage space can be reduced while reducing the labor of operators for storing the automatic traveling vehicles.

The present disclosure has been made in view of the problem described above, and an object of the present disclosure is to provide an automatic traveling vehicle and a storage facility thereof, which allow the automatic traveling vehicle to take a storage posture that can reduce the storage space by using the automatic traveling function.

An automatic traveling vehicle according to the present disclosure includes: a vehicle structure including a first top plate having an upper surface configured for a user to ride on or for a luggage to be placed on; and one or more electronic control units configured to execute automatic travel control of the automatic traveling vehicle. The one or more electronic control units are configured to execute a storage mode being one of modes of the automatic travel control when a storage execution condition for moving the automatic traveling vehicle to a storage facility is satisfied. The storage mode includes a storage posture formation process of causing the automatic traveling vehicle to automatically travel so as to take a predetermined storage posture in the storage facility together with one or more other automatic traveling vehicles having a same configuration as the automatic traveling vehicle. In the storage posture, the automatic traveling vehicle is in a superposition state in which the automatic traveling vehicle overlaps with the one or more other automatic traveling vehicles in a plan view, or a parallel state in which the automatic traveling vehicle is lined up with the one or more other automatic traveling vehicles while the first top plate and a second top plate are standing and facing each other so as to be parallel to or substantially parallel to a vertical direction. The second top plate is included in each of the one or more other automatic traveling vehicles.

The vehicle structure may include a frame configured to support the first top plate. The frame may be formed such that one end of the frame in a vehicle front-rear direction opens in a plan view and a width of the frame in a vehicle left-right direction is narrower toward a side of a remaining end of the frame in the vehicle front-rear direction. In the storage posture formation process, the one or more electronic control units may be configured to cause the automatic traveling vehicle to automatically travel such that the frame of the automatic traveling vehicle is inserted into an opening of a frame of one of the one or more other automatic traveling vehicles. In the storage posture, the automatic traveling vehicle may be in the superposition state.

The first top plate of the automatic traveling vehicle may be configured to be rotatable around a rotation shaft provided on a side of the remaining end such that the side of the one end is lifted.

The automatic traveling vehicle may further include a slope formed so as to extend from one end of the first top plate in a vehicle front-rear direction and configured to guide one of the one or more other automatic traveling vehicles so as to ride on the first top plate. In the storage posture, the automatic traveling vehicle may be in the superposition state in cooperation with one of the one or more other automatic traveling vehicles riding on the first top plate.

Each of the one or more automatic traveling vehicles may include a slope formed so as to extend from one end of the second top plate in a vehicle front-rear direction and configured to guide the automatic traveling vehicle so as to ride on the second top plate. In the storage posture formation process, the one or more electronic control units may be configured to cause the automatic traveling vehicle to automatically travel such that the automatic traveling vehicle rides on the second top plate by using the slope. In the storage posture, the automatic traveling vehicle may be in the superposition state when the automatic traveling vehicle rides on the second top plate.

The automatic traveling vehicle may further include an instrument or device foldably installed on the upper surface of the first top plate. The upper surface of the first top plate may include a storage groove formed to store the instrument or device.

The first top plate may include one or more guide grooves formed so as to guide one of the one or more other automatic traveling vehicles riding on the first top plate by using the slope.

A storage facility according to the present disclosure stores a plurality of the automatic traveling vehicles according to the present disclosure, and includes: a mobile platform including a climbing section where the automatic travel that is automatically traveling by the storage posture formation process climbs, and a falling section located in front of the climbing section in a traveling direction of the automatic traveling vehicle and formed to drop the automatic traveling vehicle, the mobile platform being configured to be movable in a direction parallel to the traveling direction; a storage location where the plurality of automatic traveling vehicles after falling in order from the falling section are arranged side by side in a direction parallel to the traveling direction in an inverted state; and one or more supports configured to support the plurality of automatic traveling vehicles in the inverted state. The plurality of automatic traveling vehicles take the storage posture in the superposition state or the parallel state at the storage location.

In the automatic traveling vehicle or the storage facility thereof according to the present disclosure, the storage execution condition may be satisfied when a task of the automatic traveling vehicle disappears.

In the automatic traveling vehicle or the storage facility thereof according to the present disclosure, the automatic traveling vehicle may further include: one or more electric motors for vehicle traveling; and a power storage device configured to supply electric power to the one or more electric motors. The storage execution condition may be satisfied when a charge rate of the power storage device drops to or below a threshold value or when it is time to charge the power storage device.

In the automatic traveling vehicle or the storage facility thereof according to the present disclosure, the storage execution condition may be satisfied when an automatic traveling function of the automatic traveling vehicle is not impaired but a failure occurs in the automatic traveling vehicle.

According to the automatic traveling vehicle of the present disclosure, when the storage execution condition for moving the automatic traveling vehicle to the storage facility is satisfied, the storage mode, which is one of the modes of the automatic travel control, is executed. The storage mode includes the storage posture formation process of causing the automatic traveling vehicle to automatically travel so as to take a predetermined storage posture in the storage facility together with one or more other automatic traveling vehicles having the same configuration as the automatic traveling vehicle according to the present disclosure. Then, in the storage posture, the automatic traveling vehicle is in the superposition state or the parallel state described above. Thus, according to the automatic traveling vehicle according to the present disclosure, it is possible to take a storage posture such that the storage space can be reduced by using the automatic traveling function. As a result, the storage space can be reduced while reducing the labor of operators for storing the automatic traveling vehicles.

Also, according to the storage facility for the automatic traveling vehicles of the present disclosure, since the above-described mobile platform, storage location, and one or more supports are provided, the automatic traveling vehicle that has automatically traveled by the storage posture formation process can take the storage posture in an inverted state.

BRIEF DESCRIPTION OF THE DRAWINGS

FIG. 13 is a diagram of a configuration of an automatic traveling vehicle and a storage facility according to a third embodiment as viewed from a lateral direction of the automatic traveling vehicle;

FIG. 14 is a plan view of the storage facility shown in FIG. 13; and

DETAILED DESCRIPTION

Figure 1:
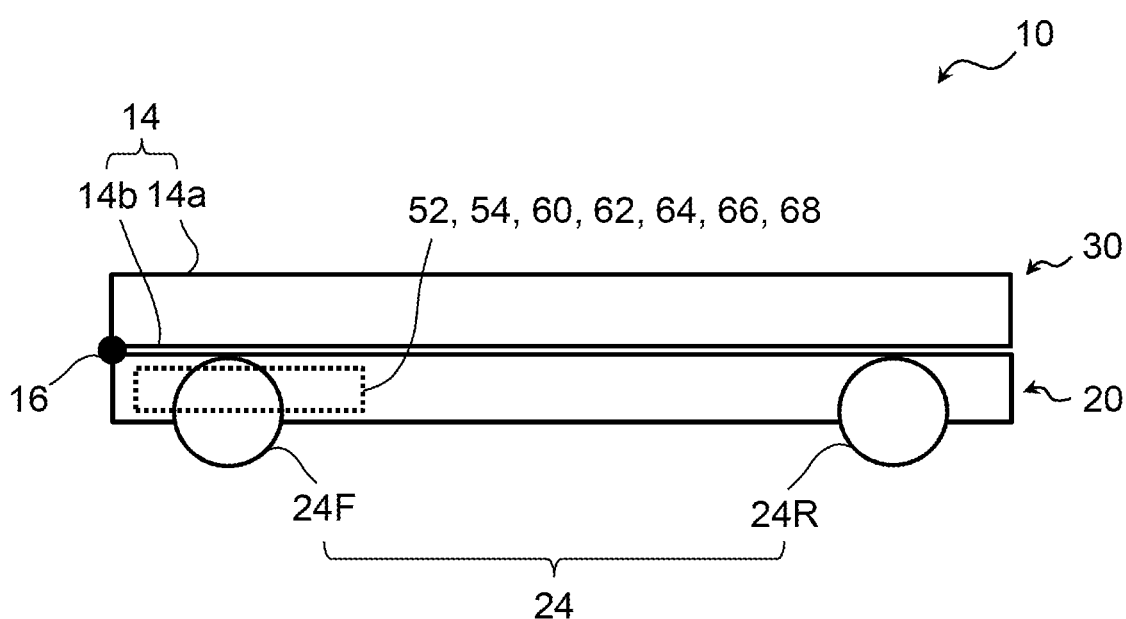
FIG. 1 is a side view of an automatic traveling vehicle according to a first embodiment.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment 1-1. Configuration Example of Automatic Traveling Vehicle

Figure 2:
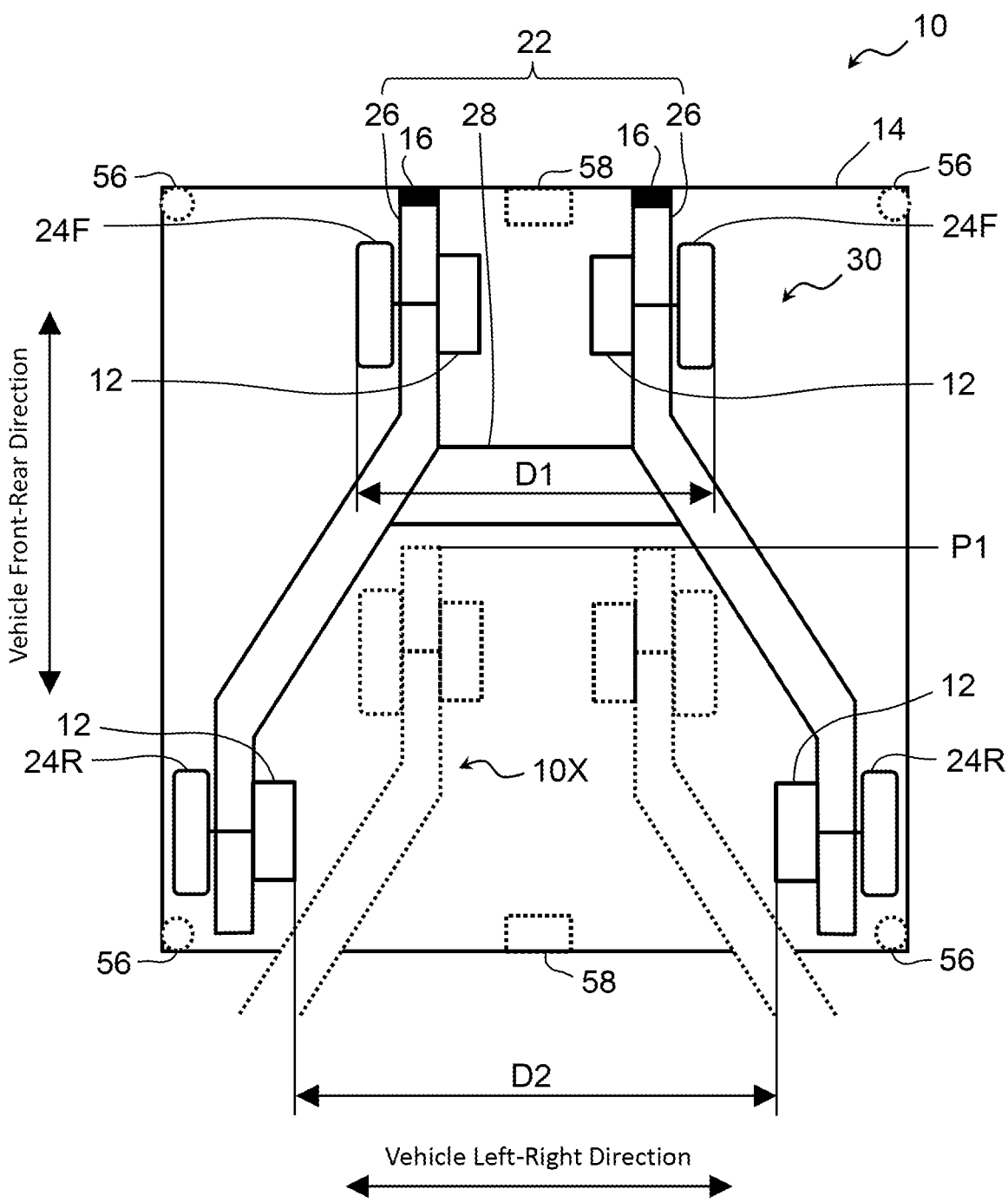
FIG. 2 is a plan view of the automatic traveling vehicle shown in FIG. 1.

FIG. 1 is a side view of an automatic traveling vehicle 10 according to a first embodiment. FIG. 2 is a plan view of the automatic traveling vehicle 10 shown in FIG. 1. The automatic traveling vehicle 10 includes electric motors 12 for vehicle traveling, and a power storage device 52 configured to supply electric power to the electric motors 12.

The automatic traveling vehicle 10 is provided with a top plate 14 on the upper portion thereof. The top plate 14 has a rectangular parallelepiped shape having a narrow width in the vertical direction (i.e., vertical direction on the paper surface in FIG. 1). The top plate 14 has an upper surface (deck) 14a and an opposite lower surface 14b. The upper surface 14a is configured for a user to ride on or for a luggage to be placed on. When the user rides, the upper surface 14a corresponds to a riding surface of the automatic traveling vehicle 10. The automatic traveling vehicle 10 can be operated unmanned. The automatic traveling vehicle 10 can be used to carry a person who rides on the top plate 14 or a luggage mounted on the top plate 14. The number of passengers when this kind of automatic traveling vehicle is used for moving people is not particularly limited, but is, for example, four. In other word, the automatic traveling vehicle 10 is a small vehicle (cart).

More specifically, the automatic traveling vehicle (hereinafter, also simply referred to as "vehicle") 10 is configured by a chassis unit 20 including the electric motors 12, and a vehicle body 30 including the top plate 14. The vehicle body 30 is supported by the chassis unit 20. It should be noted that, in the example of the vehicle 10 shown in FIGS. 1 and 2, the combination of the top plate 14 and a frame 22 of the chassis unit 20 corresponds to an example of the "vehicle structure" according to the present disclosure.

1-1-1. Chassis Unit

As shown in FIG. 2, the chassis unit 20 is a component relating to the traveling function, and includes the frame 22 and wheels 24 together with the electric motors 12. As an example, the wheels 24 are two front wheels 24F and two rear wheel 24R, each of which are arranged in a bilaterally symmetrical manner. The electric motor 12 is provided, for example, coaxially with each of the four wheels 24 in total. It should be noted that the number of the wheels 24 is arbitrarily determined in accordance with requirements such as the riding capacity of the vehicle 10 and the required driving force thereof. Instead of four, for example, a total of six wheels, i.e., three wheels on the left and three wheels on the right, may be used. Further, the number of the electric motors 12 does not necessarily have to be the same as the number of the wheels 24, and may be changed according to requirements such as the required driving force.

FIG. 2 shows a schematic shape of the frame 22. The frame 22 includes a main member 26 extending in the front-rear direction of the vehicle 10 on each of the left and right sides of the vehicle 10, and a sub-member 28 connecting the two main members 26. Two left wheels 24 and two electric motors 12 for driving them are fixed to the main member 26 on the left side of the vehicle 10. Similarly, two right wheels 24 and two electric motors 12 for driving them are fixed to the main member 26 on the right side of the vehicle 10. The top plate 14 is supported by the frame 22 (more specifically, the main member 26).

In order to enable a plurality of vehicles 10 to be superposed in a plan view as described below with reference to FIGS. 5 and 6, the chassis unit 20 is formed as follows. That is, the frame 22 (main member 26) is formed such that one end of the frame 22 in the vehicle front-rear direction (in the example shown in FIG. 2, the end on the vehicle rear side) opens in a plan view, and the width thereof in the vehicle left-right direction is narrower toward the side of the remaining end thereof in the vehicle front-rear direction (in the example shown in FIG. 2, the end on the vehicle front side).

In other words, the frame 22 is formed so as to taper toward the front wheel 24F side. More specifically, the left and right main members 26 are formed such that a distance D1 between the outer side surfaces of the two front wheels 24F is shorter than a distance D2 between the two electric motors 12 that drive the two rear wheels 24R. Then, in the front-rear direction of the vehicle 10, the sub-member 28 is arranged in front of a distal end P1 of another vehicle 10X at a limit position where a chassis unit (see the broken line in FIG. 2) of the vehicle 10X can be inserted into the inside of the chassis unit 20 from the rear side of the vehicle 10.

Acceleration and deceleration of the vehicle 10 are performed by controlling the electric motors 12. Further, the vehicle 10 can be braked, for example, by using a regenerative brake realized by the control of the electric motors 12. The vehicle 10 may be provided with a mechanical brake on any wheel 24 for braking.

Moreover, according to the vehicle 10 including the above-described chassis unit 20, by providing a difference between the rotational speeds of the two wheels 24 on the left side and the rotational speeds of the two wheels 24 on the right side, the vehicle 10 can be turned to the left and right. In the example shown in FIG. 2, each wheel 24 is a wheel having a general structure in which a tire is incorporated. Instead of this kind of example, in order to increase the degree of freedom of turning of the vehicle 10, for example, the four wheels 24 may be replaced by omnidirectional moving wheels (so-called omni wheels). Furthermore, instead of these examples, for example, a steering apparatus may be used to turn the vehicle 10.

In addition, although the vehicle 10 according to the first embodiment is a wheeled vehicle including the wheels 24, the automatic traveling vehicle according to the present disclosure is not limited to this, and may be configured as a tracked vehicle having an infinite track.

1-1-2. Vehicle Body

In the example shown in FIG. 1, the vehicle body 30 is provided with only the top plate 14 as a main component. However, in the example in which the vehicle 10 is used for moving a person, the vehicle body 30 may be provided with, for example, any removable instrument (e.g., a handrail) or device (e.g., a camera or an LIDAR) on the upper surface 14a of the top plate 14.

In order to enable a plurality of vehicles 10 to be superposed in a plan view as described below with reference to FIGS. 5 and 6, the vehicle body 30 (top plate 14) is configured as follows. That is, the top plate 14 is rotatably configured with respect to the chassis unit 20 around hinges 16 (which each correspond to "the rotation shaft provided on the side of the remaining end" according to the present disclosure) provided at end portions on the front side of the vehicle 10. As a result, as shown in FIG. 5 described below, the top plate 14 is rotatable around the hinges 16 (rotation shafts) such that the end portion on the rear side of the vehicle 10 (which corresponds to "the side of the one end" according to the present disclosure) is lifted. The rotation shafts are parallel to the vehicle left-right direction. As an example, the hinges 16 are provided between the top plate 14 and each main member 26 of the frame 22. The rotation of the top plate 14 using the hinges 16 may be performed manually, or may be performed by using an actuator (not shown) such as an electric motor.

Additionally, in the example of the vehicle 10 shown in FIG. 1, the top plate 14 is located higher than the wheels 24. Because of this, unlike the chassis unit 20 (frame 22), in order to superimpose a plurality of vehicles 10 in a plan view, it is not necessary to narrow the width of the top plate 14 in the vehicle left-right direction toward the vehicle front side. This leads to an improvement in the degree of freedom in the shape of the top plate 14. Unlike this kind of example, in an example having a structure in which the top plate overlaps the wheels in a side view, similarly to the chassis unit 20, the top plate may be formed such that the width of the top plate in the vehicle left-right direction is narrower toward the vehicle front side.

1-1-3. Control System

Figure 3:
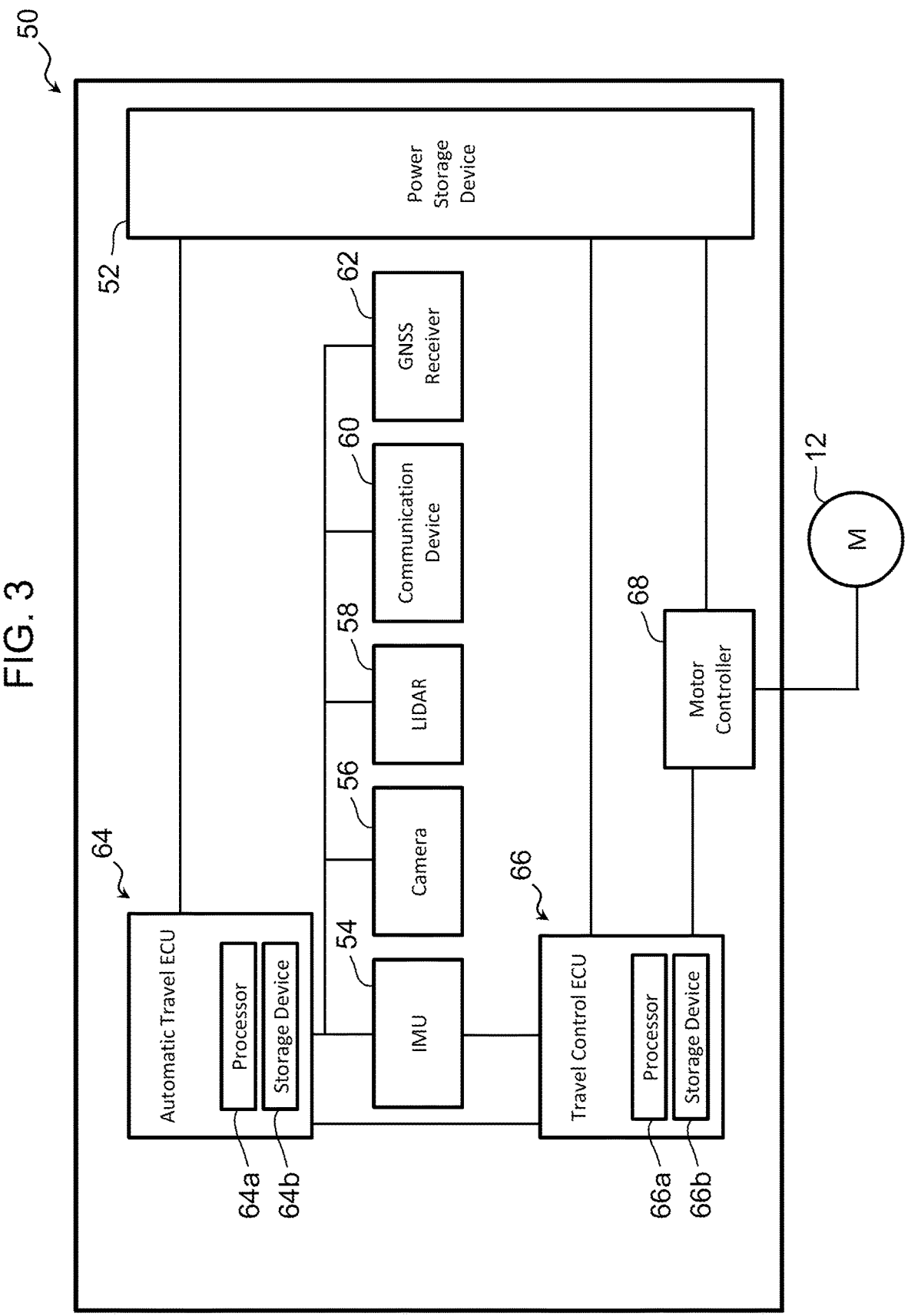
FIG. 3 is a block diagram schematically showing an example of a configuration of a control system for controlling travel of the automatic traveling vehicle shown in FIG. 1.

FIG. 3 is a block diagram schematically showing an example of the configuration of a control system 50 for controlling the travel of the automatic traveling vehicle 10 shown in FIG. 1. The control system 50 is mounted on the automatic traveling vehicle 10. The control system 50 is configured to cause the vehicle 10 to automatically travel.

As shown in FIG. 3, the control system 50 includes the above-described power storage device 52, an inertial measurement unit (IMU) 54, cameras 56, LIDARs (laser imaging detection and ranging) 58, a communication device 60, a global navigation satellite system (GNSS) receiver 62, an automatic travel electronic control unit (ECU) 64, a travel control ECU 66, and a motor controller 68. As shown in FIG. 2, the camera 56 is installed at each of the four corners of the top plate 14, and the LIDARs 58 are installed on the end surfaces of the top plate 14 on the front side and the rear side of the vehicle 10, respectively. As shown in FIG. 1 as an example, the components 52, 54, 60 to 68 of the control system 50 other than the cameras 56 and the LIDARs 58 are arranged inside the chassis unit 20 on the front side of the distal end P1 in FIG. 2.

The power storage device 52 is a secondary battery such as a lithium ion battery, a capacity or both. The power storage device 52 supplies electric power to each device (the electric motors 12 and the control system 50) mounted on the vehicle 10. The IMU 54 detects angular velocities and accelerations of three axes. Therefore, according to the IMU 54, it is possible to acquire various traveling states such as the speed (i.e., vehicle speed), the acceleration, and the posture of the vehicle 10. The IMU 54 transmits the acquired traveling states to the automatic travel ECU 64 and the travel control ECU 66.

The cameras 56 and the LIDARs 58 are examples of "external sensor" for recognizing the surrounding environment of the vehicle 10. The four cameras 56 photograph the surroundings of the vehicle 10 (more specifically, the front right, the front left, the rear right, and the rear left of the vehicle 10). The two LIDARs 58 respectively detect objects in front of and behind the vehicle 10. According to the LIDAR 58, the distance and the direction of the detected object from the vehicle 10 can be acquired. The cameras 56 and the LIDARs 58 transmit the acquired information to the automatic travel ECU 64. Additionally, instead of the example shown in FIG. 3, only one of the camera 56 and the LIDAR 58 may be used.

The communication device 60 performs communication (transmission and reception) with a communication device 72*c* of a management server 72 (see FIG. 4), which will be described later, via a wireless communication network such as 4G or 5G. Also, the communication device 60 communicates with a mobile terminal 40 (see FIG. 4), which will be described later, via a similar wireless communication network. The GNSS receiver 62 acquires the position and orientation of the vehicle 10 based on signals from GNSS satellites. The GNSS receiver 62 transmits the acquired information to the automatic travel ECU 64.

The automatic travel ECU 64 includes a processor 64*a* and a storage device 64*b*. The storage device 64*b* stores at least one program configured to cause the vehicle 10 to automatically travel. When the processor 64*a* reads and executes a program stored in the storage device 64*b*, various kinds of processing performed by the processor 64*a* are realized. Also, the storage device 64*b* stores map information as a map database. Alternatively, the processor 64*a* may acquire the map information from a map database stored in a storage device 72*b* (see FIG. 4) of the management server 72.

In an example of a use of the vehicle 10 (an example of moving people using a vehicle dispatch service using the management server 72), the destination is transmitted from the mobile terminal 40 of the user to the automatic travel ECU 64 via the management server 72. The automatic travel ECU 64 (processor 64*a*) sets a target travel route from the current position of the vehicle 10 to the destination and a target vehicle speed, on the basis of the position information of the vehicle 10 from the GNSS receiver 62 and the map information of the map database. In addition, the processor 64*a* changes (updates) the set target travel route and the set target vehicle speed as necessary on the basis of the traveling state information and the position information of the vehicle 10 based on the IMU 54 and the GNSS receiver 62, and the information of the objects around the vehicle 10 acquired by the cameras 56 and the LIDARs 58.

The automatic travel ECU 64 transmits the latest target travel route and the target vehicle speed to the travel control ECU 66. The travel control ECU 66 includes a processor 66*a* and a storage device 66*b*. The storage device 66*b* stores various kinds of information necessary for the control of each electric motor 12 to cause the vehicle 10 to automatically travel. The processor 66*a* generates a control command value (more specifically, a command value such as a rotational speed and a rotation direction) of each electric motor 12 for causing the vehicle 10 to travel so as to achieve the target travel route and the target vehicle speed. The processor 66*a* uses the information indicating the traveling state acquired by the IMU 54 to generate the control command value.

The travel control ECU 66 commands the generated control command value of each electric motor 12 to each motor controller 68. The motor controller 68 includes a drive circuit configured to control electric power supplied to the electric motors 12 from the power storage device 52, and is provided for each of the four electric motors 12. Each motor controller 68 controls energization to each electric motor 12 according to the control command value from the travel control ECU 66.

According to the control by the automatic travel ECU 64 and the travel control ECU 66 described above, the vehicle 10 can automatically travel toward the destination. It should be noted that, in the example of the control system 50 shown in FIG. 3, the automatic travel ECU 64 and the travel control ECU 66 that perform automatic travel control of the vehicle 10 correspond to an example of "one or more electronic control units" according to the present disclosure.

1-2. Configuration Example of Operation Management System for Vehicle

Figure 4:
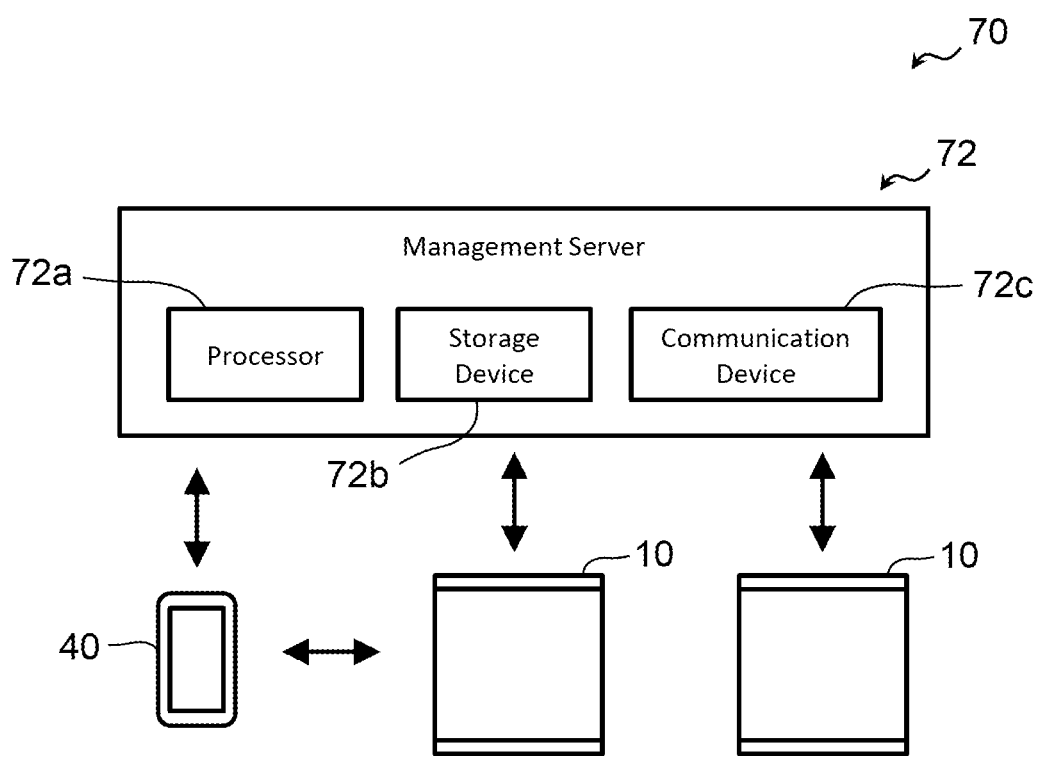
FIG. 4 is a block diagram schematically showing a configuration of an operation management system according to the first embodiment.

FIG. 4 is a block diagram schematically showing a configuration of an operation management system 70 according to the first embodiment. The vehicle 10 configured as described above can be used to provide various mobility services for the movement of people or the transportation of luggage. In order to provide such various mobility services, the operation management system 70 is configured to manage the operation of a plurality of vehicles 10.

Specifically, the operation management system 70 includes a mobile terminal 40 and a management server 72 together with a plurality of vehicles 10. The mobile terminal 40 is carried by the user of the vehicle 10 and is, for example, a smartphone or a tablet personal computer. The mobile terminal 40 includes a processor, a storage device, and a communication device.

The management server 72 includes a processor 72*a*, a storage device 72*b*, and a communication device 72*c*. The storage device 72*b* stores at least one program for various mobility services for the movement of people or the transportation of luggage. The processor 72*a* reads and executes a program stored in the storage device 72*b*. Accordingly, various functions for providing the various mobility services are realized. For example, the management server 72 (communication device 72*c*) communicates with the communication device 60 of each vehicle 10 and the mobile terminal 40 via a wireless communication network. Also, the management server 72 manages user information. Further, the management server 72 performs operation management of the plurality of vehicles 10. The operation management of the plurality of vehicles 10 by the management server 72 may include, for example, a remote operation of the vehicle 10 in an emergency by an operator via the management server 72.

1-3. Storage Mode

The automatic travel ECU 64 is configured to execute a "storage mode" which is one of the modes of the automatic travel control when a "storage execution condition" for moving the vehicle 10 to a predetermined storage facility is satisfied. Another mode of the automatic travel control is a basic mode of the automatic travel control (that is, a mode in which automatic traveling is performed for moving to a destination based on a request from a user or a command from the management server 72). Specific examples of the storage execution condition will be described below with reference to FIG. 7.

The storage mode includes a "storage posture formation process" performed within the storage facility. This storage posture formation process is executed to automatically driving the vehicle 10 so as to take the "storage posture" shown in the following FIGS. 5 and 6 together with one or more other vehicles (for example, vehicle 10X shown in FIG. 2) having the same configuration (more specifically, the same outer shape and the same function) as the vehicle 10.

Figure 5:
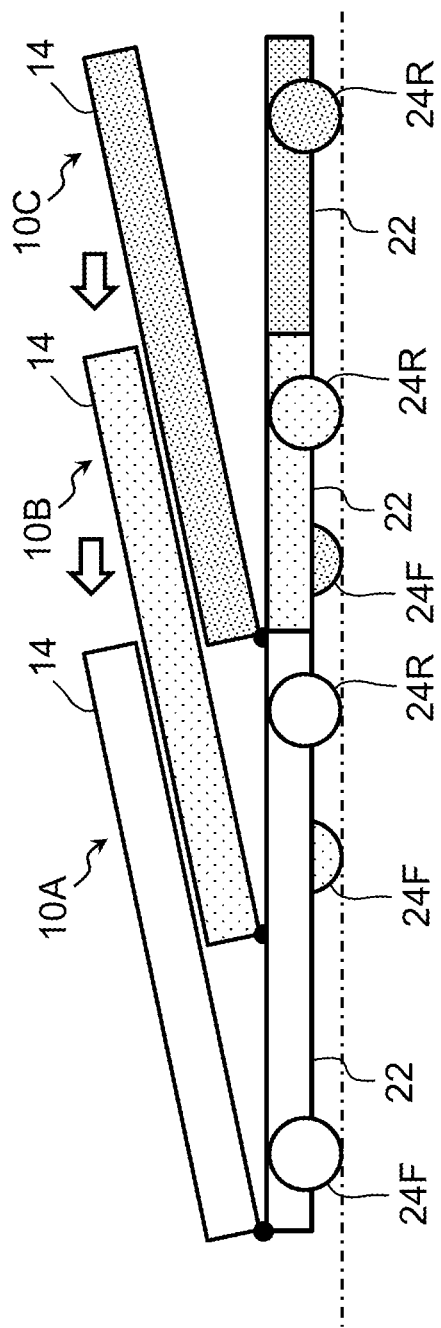
FIG. 5 is a side view showing a state in which a plurality of automatic traveling vehicles according to the first embodiment are in a storage posture.
Figure 6:
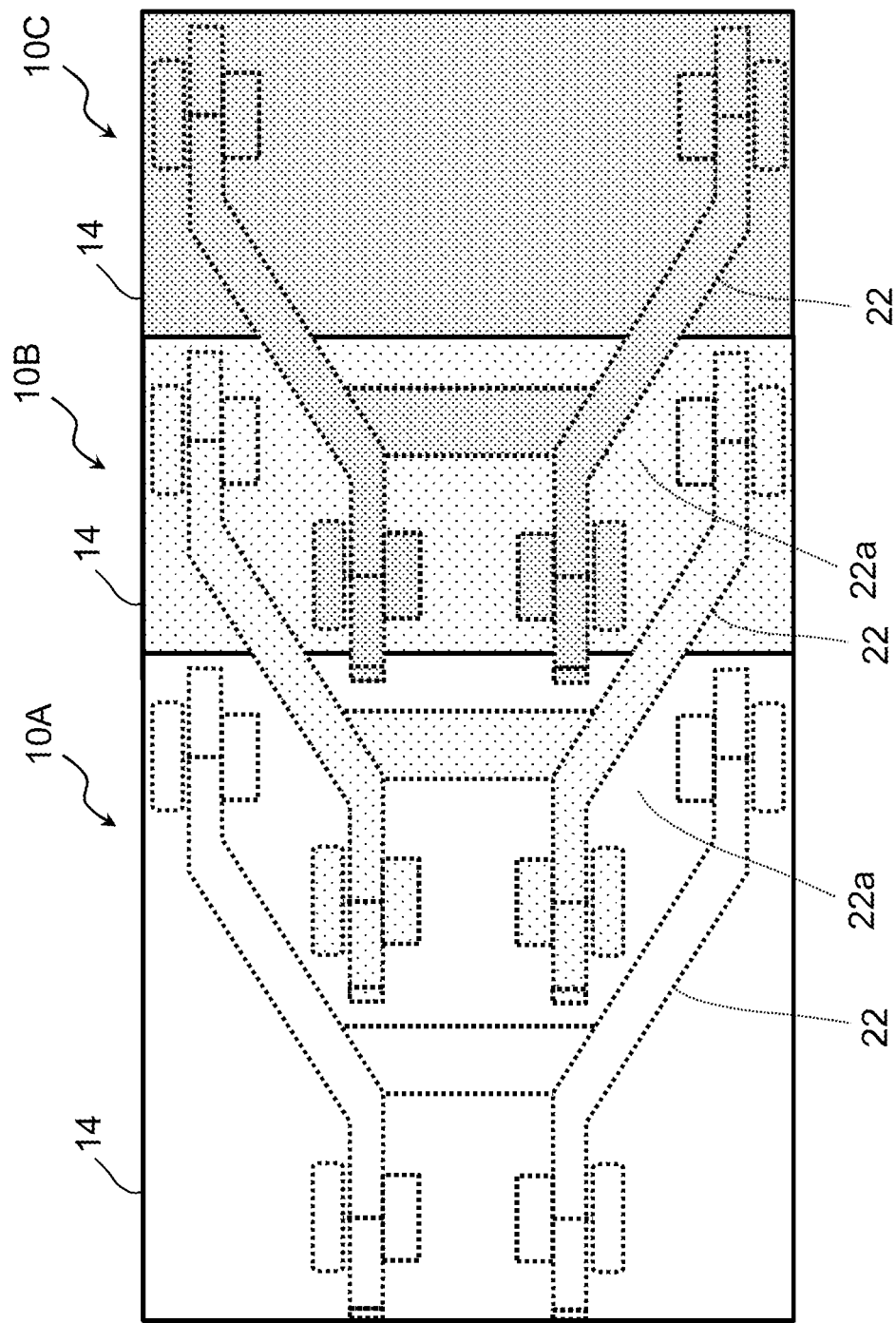
FIG. 6 is a plan view showing a state in which a plurality of automatic traveling vehicles according to the first embodiment are in the storage posture.

FIGS. 5 and 6 are a side view and a plan view respectively showing a state in which a plurality of automatic traveling vehicles 10 according to the first embodiment are in the storage posture. FIGS. 5 and 6 show, as examples, how three vehicles 10A, 10B, and 10C are in the storage posture according to the first embodiment.

As described above, the frame 22 of the vehicle 10 is formed such that one end of the frame 22 in the vehicle front-rear direction (i.e., the end on the vehicle rear side) opens in a plan view and the width thereof in the vehicle left-right direction is narrower toward the side of the remaining end thereof in the vehicle front-rear direction (i.e., the end on the vehicle front side). Then, the vehicle body 30 (top plate 14) is rotatable such that the end portion on the rear side of the vehicle 10 is lifted by using the hinges 16.

The storage posture formation process is executed, for example, in a state in which the top plate 14 is opened as shown in FIG. 5 after the vehicle 10 has completed a predetermined task (movement of people or transportation of luggage) and returned to the storage facility. In the example shown in FIG. 5, each of the automatic travel ECUs 64 of the vehicles 10B and 10C executes the storage posture formation process.

Specifically, the vehicle 10A, which has returned to the storage facility prior to the vehicles 10B and 10C, has stopped at a predetermined storage location in the storage facility. The automatic travel ECU 64 of the vehicle 10B returning after the vehicle 10A executes the storage posture formation process to cause the vehicle 10B to automatically travel such that the frame 22 of the vehicle 10B is inserted into an opening 22*a* of the frame 22 of the vehicle 10A. More specifically, in the example shown in FIG. 5, the vehicle 10B moves forward by the automatic traveling function. As a result, the storage posture is realized in a state in which the vehicle 10B overlaps the vehicle 10A in a plan view (see FIG. 6) (which corresponds to the "superposition state" according to the present disclosure).

Similarly, the automatic travel ECU 64 of the vehicle 10C returning after the vehicle 10B executes the storage posture formation process to cause the vehicle 10C to automatically travel such that the frame 22 of the vehicle 10C is inserted into an opening 22*a* of the frame 22 of the vehicle 10B. As a result, the storage posture is realized in a state (superposition state) in which the vehicle 10C overlaps the vehicle 10B in a plan view (see FIG. 6).

Additionally, in order to enhance the control of alignment using image recognition by the cameras 56 in the automatic traveling by the storage posture formation process for taking the storage posture described above, a mark such as an AR (Augmented Reality) marker may be attached to an end portion on the rear side of the vehicle 10 to be inserted by another vehicle 10, if necessary. This also applies to the following second embodiment.

It should be noted that, in the example shown in FIGS. 5 and 6, the vehicle 10A with respect to the vehicle 10B (similarly, the vehicle 10B with respect to the vehicle 10C) corresponds to an example of "one of the one or more other automatic traveling vehicles" according to the present disclosure. Also, the top plate 14 corresponds to an example of the "first top plate" when the vehicle 10 to be described corresponds to the "automatic traveling vehicle" according to the present disclosure. On the other hand, when the vehicle 10 to be described corresponds to "one or more other automatic traveling vehicles" (hereinafter, may also referred to as counterpart vehicle) according to the present disclosure, the top plate 14 corresponds to an example of the "second top plate". This also applies to the second embodiment described below.

Additionally, when a plurality of vehicles 10 are in the above-described storage posture in the storage facility, the charging of the power storage devices 52 of the plurality of vehicles 10 may be performed. In other words, the storage location of the plurality of vehicles 10 may also serve as their charging location.

1-3-1. Flow of Processing Relating to Execution of Storage Mode

Figure 7:
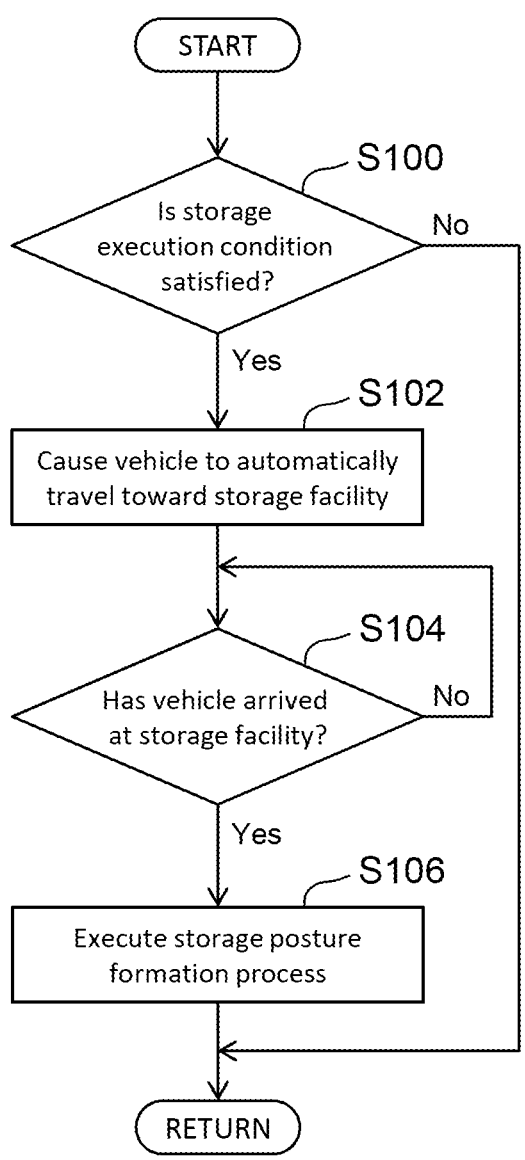
FIG. 7 is a flowchart showing a flow of processing relating to execution of a storage mode according to the first embodiment.

FIG. 7 is a flowchart showing a flow of processing relating to execution of the storage mode according to the first embodiment. The processing of this flowchart is started when the vehicle 10 is outside the storage facility to perform a predetermined task (movement of people or transportation of luggage).

In FIG. 7, in step S100, the automatic travel ECU 64 (processor 64*a*) determines whether or not a predetermined storage execution condition is satisfied. The determination as to whether or not the storage execution condition is satisfied can be performed by, for example, the following method.

First, in an example in which the management server 72 manages the task of each vehicle 10, the management server 72 issues a return command to the storage facility to a vehicle 10 that has completed the task. The storage execution condition is satisfied when this kind of return command is issued. On the other hand, in an example in which each vehicle 10 itself determines the presence or absence of a task, the storage execution condition is satisfied when the automatic travel ECU 64 determines that the task has disappeared. The determination as to whether or not the task of a vehicle 10 has disappeared can be performed based on, for example, whether or not a predetermined time has elapsed from the meeting time with the person who reserved the vehicle 10 without boarding, or whether or not the task of transporting a luggage is not performed for a predetermined time or more.

Moreover, the storage execution condition may be satisfied, for example, when the charging rate SOC (State Of Charge) of the power storage device 52 of the vehicle 10 is lowered to a predetermined threshold value or less, or when it is time to charge the power storage device 52. In addition, the determination as to whether or not it is time to charge the power storage device 52 can be performed based on, for example, whether or not a predetermined time has arrived, or whether or not the elapsed time since leaving the storage facility (i.e., the traveling time of the vehicle 10) has reached a predetermined time.

Furthermore, the storage execution condition may be satisfied, for example, when it is detected that the automatic traveling function of the vehicle 10 is not impaired but some kind of failure has occurred in the vehicle 10. The failure referred to here corresponds to, for example, a communication abnormality between the vehicle 10 and the management server 72 (in other words, a situation in which the vehicle 10 cannot receive a task from the management server 72). Also, in an example provided with a load sensor (not shown) configured to detect the load acting on the top plate 14 for the purpose such as detection of the ride of the user, the failure corresponds to, for example, a situation in which this load sensor exhibits an abnormal output. In addition, whether or not the load sensor exhibits an abnormal output can be determined, for example, when the load sensor exhibits an output even though it is recognized based on the image of the camera (not shown) that no user is on the top plate 14. The camera referred to here is a camera mounted on the vehicle 10 to photograph the riding space of the vehicle 10 or a camera installed in the city or town (i.e., infrastructure sensor).

When the storage execution condition is not satisfied in step S100, the automatic travel ECU 64 ends the current process cycle. On the other hand, when the storage execution condition is satisfied in step S100, the automatic travel ECU 64 executes the processing of steps S102 to S106 relating to the storage mode.

In step S102, the automatic travel ECU 64 sets the storage facility as a destination and causes the vehicle 10 to automatically travel toward the storage facility. That is, the processing of step S102 is also included in the storage mode. In step S104, the automatic travel ECU 64 determines whether or not the vehicle 10 has arrived at the storage facility. As a result, when the vehicle 10 arrives at the storage facility, the process proceeds to step S106.

More specifically, in an example in which an instrument or device is mounted on the top plate 14, this kind of instrument or device is removed by an operator. Then, in an example in which the top plate 14 is manually rotated to take the storage posture (see FIG. 5), after an operator of the storage facility rotates the top plate 14 of the vehicle 10, the automatic travel ECU 64 of the vehicle 10 executes the processing of step S106. On the other hand, in an example including an actuator capable of rotating the top plate 14, the storage mode includes a process of controlling the actuator to lift the top plate 14. Therefore, after executing this process, the automatic travel ECU 64 of the vehicle 10 executes the processing of step S106.

In step S106, the automatic travel ECU 64 executes the storage posture formation process. Specifically, when the vehicle 10 whose processing has proceeded to step S106 becomes the head of the row of a plurality of vehicles 10 at the storage location in the storage facility, the automatic travel ECU 64 causes this vehicle 10 to automatically travel toward the leading position. On the other hand, when it is not the head of the row, the automatic travel ECU 64 causes the vehicle 10 to automatically travel such that the frame 22 thereof is inserted into the opening 22a of the frame 22 of the counterpart vehicle 10 which is lined up earlier in the row.

1-4. Effect

According to the automatic traveling vehicle 10 of the first embodiment described above, when the storage execution condition is satisfied, the storage mode is executed, and the automatic traveling vehicle 10 performs the automatic traveling in order to take the storage posture as shown in FIGS. 5 and 6. When this storage posture is taken, a state (superposition state) in which a plurality of automatic traveling vehicles 10 are overlapped in a plan view is formed as shown in FIGS. 5 and 6. Thus, according to the automatic traveling vehicle 10 of the first embodiment, it is possible to take the storage posture that can reduce the storage space by using the automatic traveling function. As a result, the storage space can be reduced while reducing the labor of operators for storing the automatic traveling vehicles.

Figure 8:
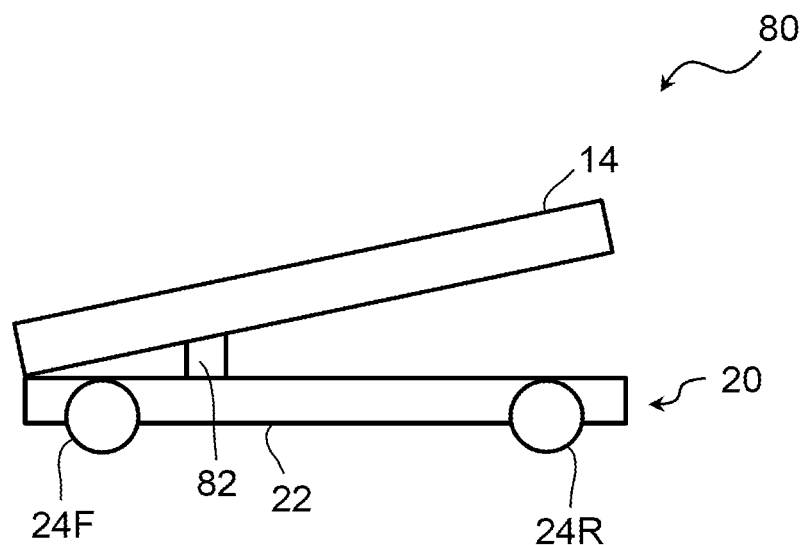
FIG. 8 is a side view used to describe a configuration of an automatic traveling vehicle in a modified example according to the first embodiment.

1-5. Modified Examples According to First Embodiment 1-5-1. Example of Top Plate not Rotatable FIG. 8 is a side view used to describe a configuration of an automatic traveling vehicle 80 in a modified example according to the first embodiment. This automatic traveling vehicle 80 is different from the automatic traveling vehicle 10 according to the first embodiment in that the hinges 16 are not provided. In this vehicle 80, in order to be able to superimpose a plurality of vehicles 80 in a plan view by using the automatic traveling function, the top plate 14 is supported (fixed) by the chassis unit 20 (frame 22) via a support member 82 in a state of being inclined with respect to the horizontal direction such that the end portion on the rear side of the vehicle 80 is lifted.

1-5-2. Another Configuration Example of Frame and Top Plate

In order to take the similar storage posture to that shown in FIGS. 5 and 6, a frame of each automatic traveling vehicle may be formed such that, contrary to the example shown in FIG. 2 described above, an end of the frame on the vehicle front side (which corresponds to another example of "one end of the frame in a vehicle front-rear direction" according to the present disclosure) opens in a plan view, and the width of the frame in the vehicle left-right direction is narrower toward the side of an end of the frame on the vehicle rear side (which corresponds to another example of "remaining end of the frame in the vehicle front-rear direction"). Also, the top plate may be rotatable such that the end on the vehicle front side is lifted around a rotation axis provided on the side of the end on the vehicle rear side, may be supported (fixed) by the frame such that the end portion on the vehicle front side is lifted. Furthermore, in order to take the storage posture, the electronic control unit may cause one or more automatic traveling vehicles to move backward in the storage posture formation process.

2. Second Embodiment

A second embodiment is different from the above-described first embodiment mainly in the storage posture used in the storage mode and the structure of the automatic traveling vehicle for taking the storage posture.

2-1. Configuration Example of Automatic Traveling Vehicle

Figure 9:
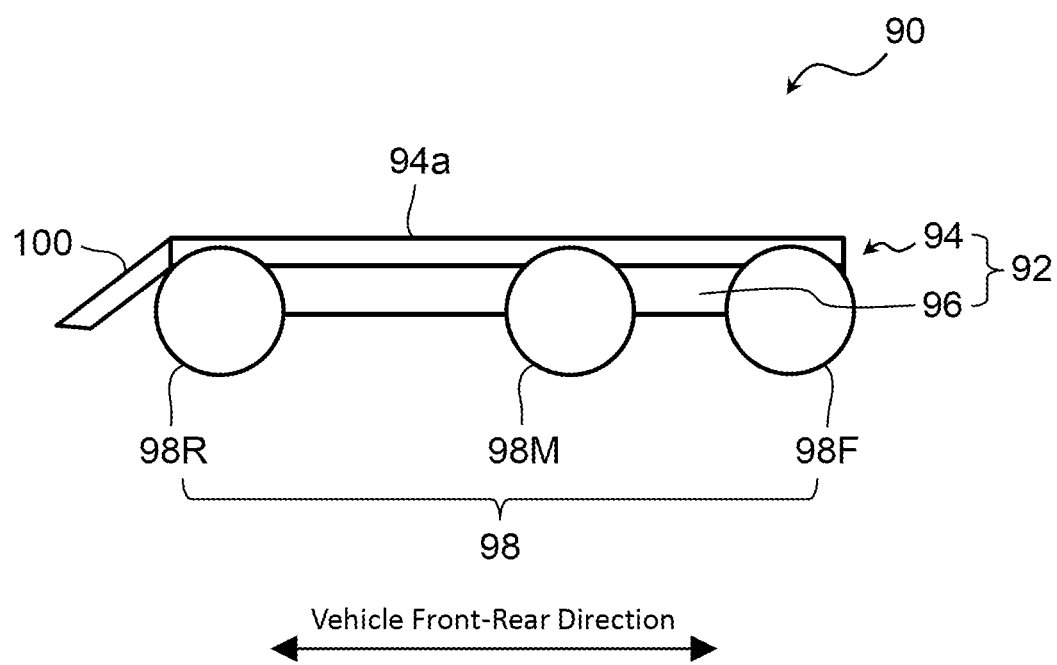
FIG. 9 is a side view of an automatic traveling vehicle according to a second embodiment.

FIG. 9 is a side view of an automatic traveling vehicle 90 according to the second embodiment. This automatic traveling vehicle 90 is provided with a vehicle structure 92. The vehicle structure 92 includes a top plate 94, and a frame 96 that supports the top plate 94. The vehicle structure 92 as a whole has a substantially rectangular parallelepiped shape having a narrow width in the vertical direction (i.e., vertical direction on the paper surface in FIG. 9). The top plate 94 includes an upper surface (deck) 94a configured for a user to ride on or for a luggage to be placed on.

A chassis unit of the vehicle 90 is provided with six wheels 98 (i.e., two front wheels 98F, two middle wheels 98M, and two rear wheels 98R, each of which are arranged in a bilaterally symmetrical manner). The electric motor 12 is provided on each of the six wheels 98 as an example. Further, although the plan view of the vehicle 90 is omitted, unlike the vehicle 10, the main member of the frame 96 of the vehicle 90 extends parallel to the vehicle front-rear direction. In addition, the top plate 94 may integrally form the upper portion of a frame instead of the example of being separate from the frame 96 of the chassis unit. Also, the number of wheels of the automatic traveling vehicle that takes a storage posture according to the second embodiment described below is not limited to six, and may be four, for example, as in the first embodiment.

Moreover, the vehicle 90 includes the control system 50 shown in FIG. 3, and has an automatic traveling function similar to that of the vehicle 10. Furthermore, the operation of the vehicle 90 is managed by an operation management system similar to the operation management system 70 shown in FIG. 4.

Then, the vehicle 90 according to the second embodiment is provided with a slope 100 formed so as to extend from one end of the top plate 94 in the vehicle front-rear direction (in the example shown in FIG. 9, the end on the vehicle rear side). The slope 100 is formed to guide a counterpart vehicle to ride on the top plate 94 of the vehicle 90. In addition, the slope 100 may be formed integrally with the top plate 94, or may be formed separately from the top plate 94.

2-2. Storage Mode (Storage Posture)

Figure 10:
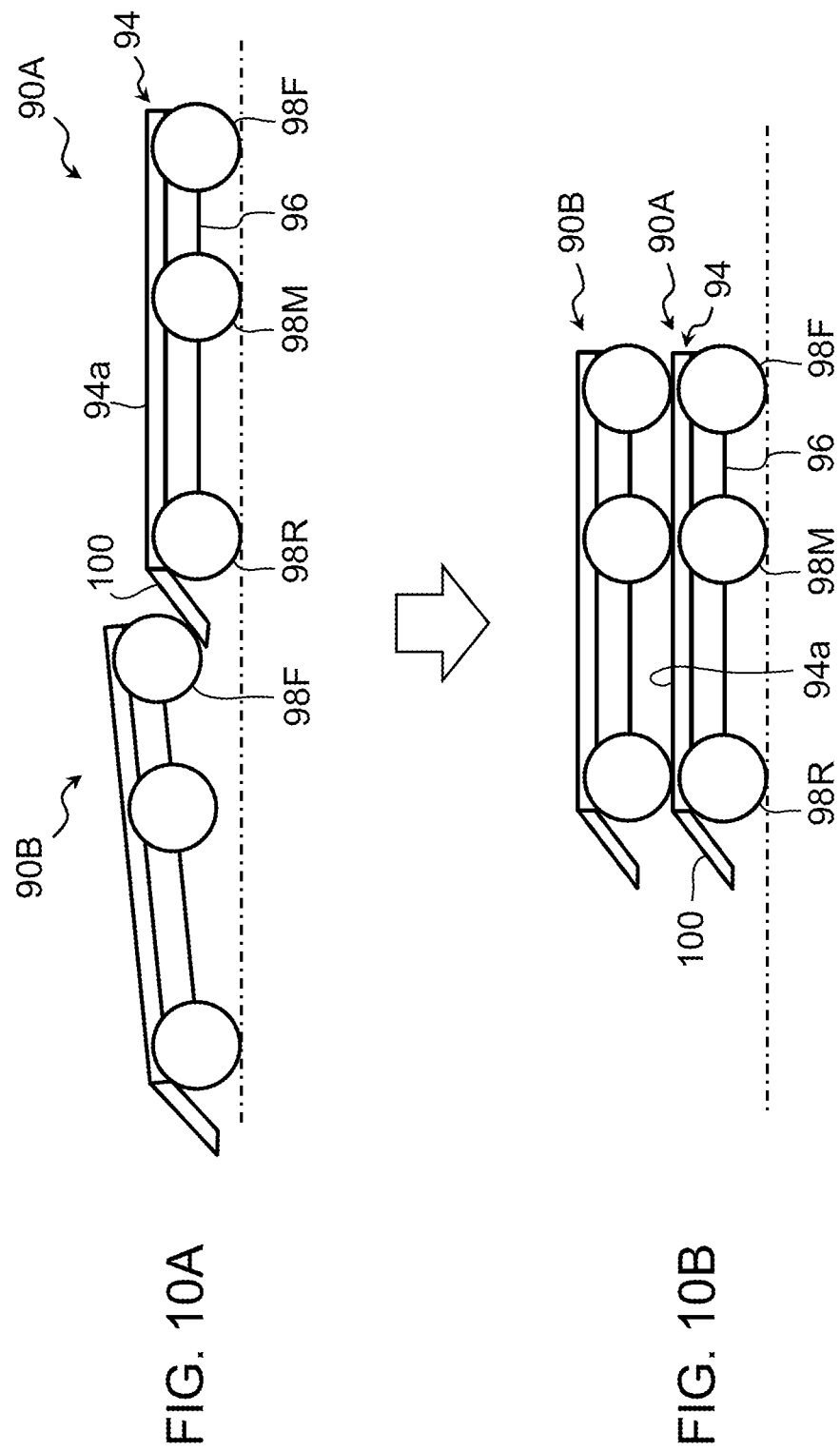
FIG. 10A is a side view used to describe a storage posture used in a storage mode according to the second embodiment.
FIG. 10B is a side view used to describe the storage posture used in the storage mode according to the second embodiment.

FIGS. 10A and 10B are side views used to describe a storage posture used in the storage mode according to the second embodiment. FIG. 10B shows how two vehicles 90A and 90B are in the storage posture according to the second embodiment. Thus, in the storage posture according to the second embodiment, one vehicle 90B is riding on another vehicle 90A. In this storage posture, the two vehicles 90A and 90B are in an overlapped state (superposition state) in a plan view.

More specifically, the vehicle 90A arrives at the storage facility prior to the vehicle 90B. The automatic travel ECU 64 of the vehicle 90A causes the vehicle 90A to automatically travel toward a predetermined storage location. The automatic travel ECU 64 of the vehicle 90B arriving at the storage facility after the vehicle 90A executes the storage posture formation process to cause the vehicle 90B to automatically travel for loading the vehicle 90B on the top plate 94 of the vehicle 90A by using the slope 100 of the vehicle 90A. FIG. 10A shows how the vehicle 90B starts to ride on the slope 100 of the vehicle 90A. More specifically, in the example shown in FIG. 10A, the vehicle 10B moves forward by the automatic traveling function.

It should be noted that, since an example of the flow of processing relating to the execution of the storage mode according to the second embodiment is similar to that of the flowchart shown in FIG. 7 described in the first embodiment, the description using a flowchart is omitted here. This also applies to a third embodiment described below.

Additionally, in order to make it easier to cause one vehicle 90B to ride on top of another vehicle 90A as shown in FIG. 10B, during the execution of the storage posture formation process according to the second embodiment, the electric motors 12 may be controlled so as to exert a torque higher than a specified torque used during the execution of the normal automatic travel control. Moreover, in the example of the vehicle 90 having six wheels 98, the vehicle 90 may be provided with a bogie mechanism (not shown) in order to facilitate riding on the counterpart vehicle 90. The bogie mechanism is a mechanism that enables the front wheels 98F and the middle wheels 98M to swing integrally around a swing shaft parallel to the wheel shaft.

2-3. Effect

According to the automatic traveling vehicle 90 according to the second embodiment described above, when the storage execution condition is satisfied, the storage mode is executed, and the vehicle 90 performs the automatic traveling in order to take the storage posture as shown in FIG. 10B. According to the storage posture shown in FIG. 10B, the space in the arrangement direction of a plurality of vehicles 10 during storage (i.e., the left-right direction on the paper surface in FIG. 10B) can be reduced by about half as compared with an example in which vehicles 90 having no slope 100 are simply arranged one by one in the arrangement direction. As described above, the automatic traveling vehicle 90 according to the second embodiment can also take the storage posture that can reduce the storage space by using the automatic traveling function.

Moreover, when the storage posture according to the second embodiment is used, the vehicle 90 (vehicle 90A in FIG. 10B) on the lower side and the vehicle 90 (vehicle 90B in FIG. 10B) on the upper side in the storage posture may be determined in advance. Then, in the example in which such a method is adopted, the slope 100 may be formed only on the vehicle 90 on the lower side. Furthermore, if this method is adopted in an example in which a removable instrument or device is mounted on the top plate 94, the work of removing the instrument or device can be omitted for the vehicle 90 on the upper side.

Figure 11:
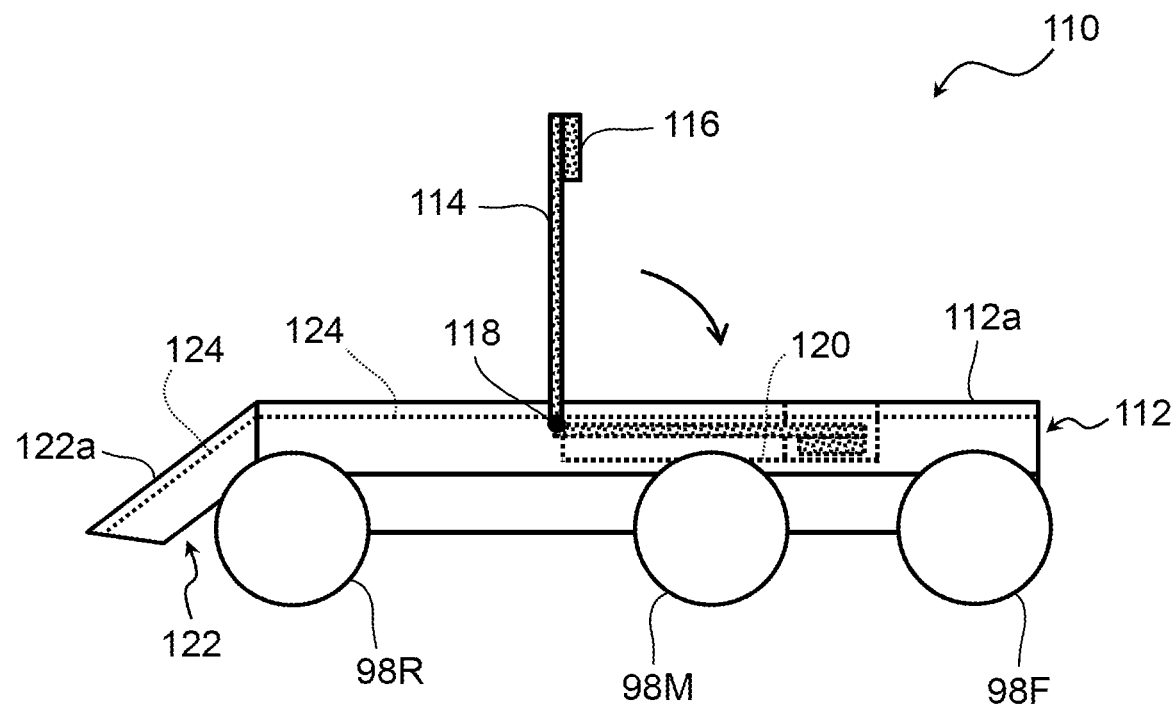
FIG. 11 is a side view used to describe a configuration of an automatic traveling vehicle in a modified example according to the second embodiment.
Figure 12A:
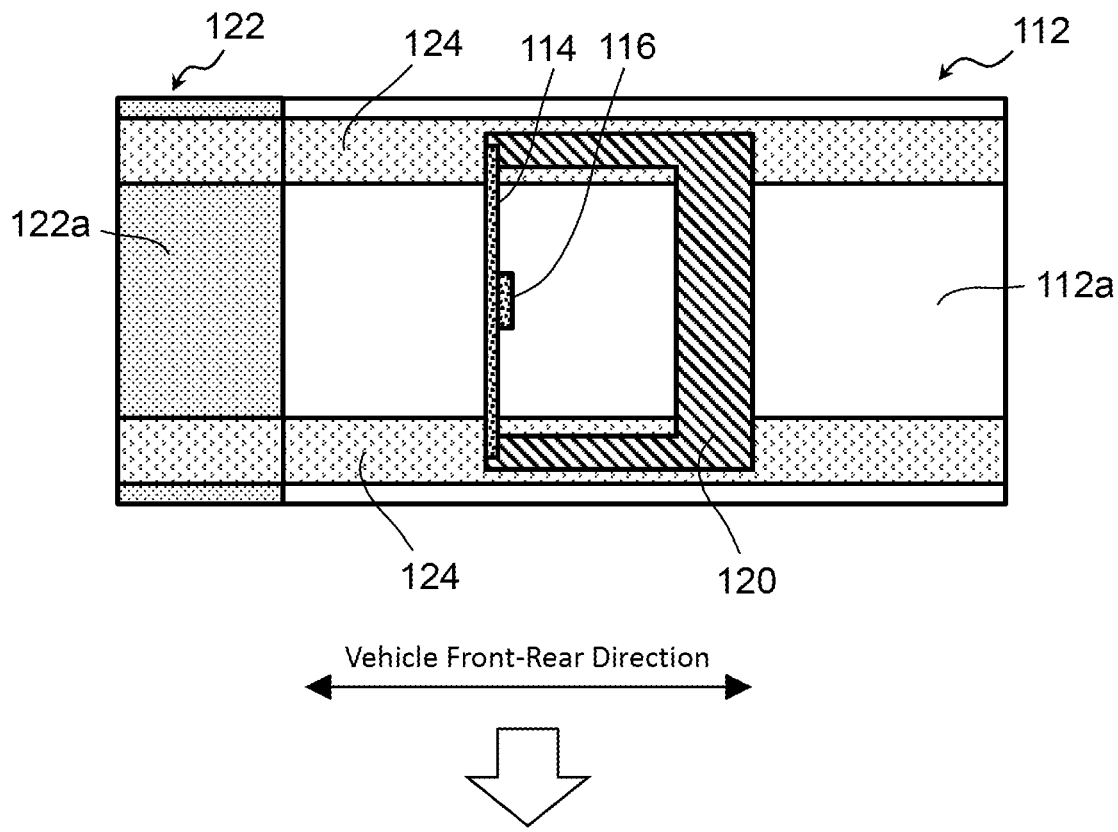
FIG. 12A is a plan view used to describe a configuration of the automatic traveling vehicle shown in FIG. 11.
Figure 12B:
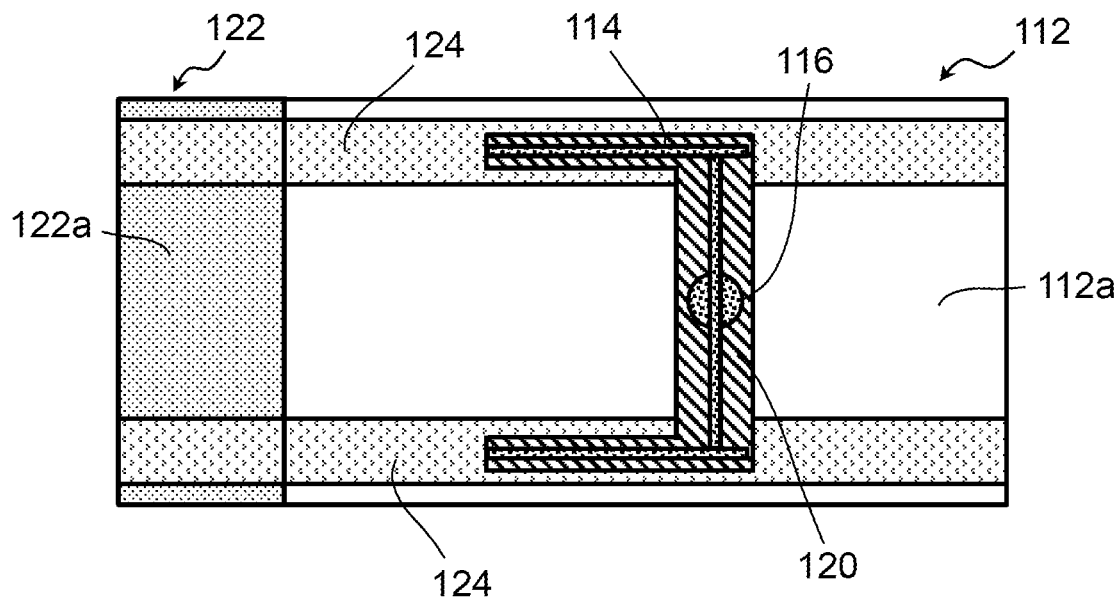
FIG. 12B is a plan view used to describe the configuration of the automatic traveling vehicle shown in FIG. 11.

2-4. Modified Examples According to Second Embodiment 2-4-1. Another Example of Top Plate Structure FIG. 11 is a side view used to describe a configuration of an automatic traveling vehicle 110 in a modified example according to the second embodiment. FIGS. 12A and 12B are plan views used to describe the configuration of the automatic traveling vehicle 110 shown in FIG. 11. This automatic traveling vehicle 110 is different from the automatic traveling vehicle 90 according to the second embodiment in the top plate structure.

Specifically, an external sensor 116 supported by a support 114 is attached to an upper surface 112a of a top plate 112 of the vehicle 110. The external sensor 116 is, for example, a camera or a LIDAR. The support 114 is rotatable around a hinge 118 provided at a connection portion between the support 114 and the top plate 112. With this kind of structure, the support 114 to which the external sensor 116 is fixed can be folded toward the vehicle front side.

A storage groove 120 for accommodating the support 114 to which the external sensor 116 is fixed is formed on the upper surface 112a of the top plate 112. FIGS. 12A and 12B show a state before storage and a state after storage, respectively. By using the storage groove 120, the support 114 to which the external sensor 116 is fixed can be accommodated inside the upper surface 112a.

When the vehicle 110 is stored, the storage of the support 114 may be done by the hands of an operator. Moreover, an actuator (not shown) for rotationally driving and folding the support 114 may be provided. Then, at the time of storage, a process of driving the actuator to fold the support 114 may be executed as a process included in the "storage mode" together with the storage posture formation process. Alternatively, the support 114 may be folded by being pushed down by the counterpart vehicle 110 that rides on the top plate 112. Instead of the support 114 to which the external sensor 116 is fixed, any instrument (e.g., a handrail) or any device other than the external sensor 116 may be foldably attached to the top plate 112.

Moreover, two guide grooves 124 for guiding the left and right wheels 98 of the counterpart vehicle 110 that rides on the top plate 112 are formed on the upper surface 112a of the top plate 112 and an upper surface 122a of a slope 122. Each guide groove 124 is formed so as to extend parallel to the vehicle front-rear direction. By using this kind of guide grooves 124, it is possible to easily align the counterpart vehicle 110 that rides on the top plate 112. Furthermore, in order to prevent the folded support 114 from being stepped on by the counterpart vehicle 110, the storage groove 120 is formed to be deeper than the guide grooves 124. In addition, this kind of guide grooves may not be formed on the upper surface 122a of the slope 122 but may be formed only on the upper surface 112a of the top plate 112.

Additionally, in the example of vehicle 110, as shown in FIG. 12A, a part of each guide groove 124 is shared with the storage groove 120. Instead of this kind of example, the guide grooves may be formed separately from the storage groove. Further, in an example in which a foldable instrument or device, such as the support 114, is not provided on the upper surface of the top plate, only the guide grooves may be formed on the upper surface.

2-4-2. Another Configuration Example of Slope

In order to take a storage posture similar to that shown in FIG. 10B, contrary to the example of the slope 100 shown in FIG. 9 described above, the slope may be formed so as to extend from the end of the top plate 94 on the vehicle front side (which corresponds to another example of "one end of the first top plate in a vehicle front-rear direction" according to the present disclosure). Then, in an automatic traveling vehicle V2 on the side of riding on a top plate of an automatic traveling vehicle V1 having the slope formed in this manner, an electronic control unit of the vehicle V2 may cause the vehicle V2 to move backward in the storage posture formation process.

3. Third Embodiment

A third embodiment is different from the second embodiment mainly in the storage posture used in the storage mode. In the third embodiment, the storage posture of a plurality of vehicles is realized by using the equipment in the storage facility.

3-1. Configuration Example of Storage Facility

FIG. 13 is a diagram of the configuration of an automatic traveling vehicle 130 and a storage facility 140 according to the third embodiment as viewed from the lateral direction of the automatic traveling vehicle 130. FIG. 14 is a plan view of the storage facility 140 shown in FIG. 13. This automatic traveling vehicle 130 is configured similarly to the vehicle 110 according to the second embodiment, except that a top plate 132 is not provided with the slope 100. FIGS. 13 and 14 exemplify three vehicles 130A, 130B, and 130C to be stored.

The storage facility 140 is a facility for storing a plurality of vehicles 130 such as vehicles 130A to 130C. The storage facility 140 includes a mobile platform 142, a storage location 144, and a support 146.

The mobile platform 142 includes a climbing section 148 and a falling section 150. The climbing section 148 is a section in which the vehicle 130, which is automatically traveling by the storage posture formation process at the time of storage, climbs. The falling portion 150 is located in front of the climbing section 148 in the vehicle traveling direction (the "traveling direction" according to the present disclosure), and is a section for dropping, from the mobile platform 142, the vehicle 130 that has climbed on the mobile platform 142. FIG. 13 shows how the vehicle 130C climbs on the mobile platform 142 and then falls. In addition, in the example shown in FIG. 13, the vehicle 130 moves forward by the storage posture formation process and then falls. Alternatively, the vehicle 130 may fall after moving backward by the storage posture formation process. This also applies to an example shown in FIG. 15 described below.

In order for a plurality of vehicles 130 to take a storage posture in order at the storage location 144, every time one vehicle 130 falls, it is necessary to move the mobile platform 142 so as to be away from the support 146 by a predetermined distance. Therefore, the mobile platform 142 is configured to be movable in a direction parallel to the vehicle traveling direction (in FIGS. 13 and 14, the left-right direction on the paper surface). As an example of this kind of configuration, the mobile platform 142 includes a plurality of rollers 152 for moving the mobile platform 142 in a direction parallel to the vehicle traveling direction.

The storage location 144 is a space in which a plurality of vehicles 130 after falling in order from the falling section 150 are arranged side by side in a direction parallel to the vehicle traveling direction and are in an inverted state. A cushion 156 is laid on a ground surface 154 of the storage facility 140 to cushion an impact acting on the vehicle 130 when the vehicle 130 falls from the mobile platform 142.

The cushion 156 is installed so as to extend along the vehicle traveling direction (in other words, the arrangement direction in which a plurality of vehicles 130 are arranged in the storage location 144). As shown in FIG. 14, the mobile platform 142 is movably arranged in a direction parallel to the vehicle traveling direction while straddling the cushion 156. In addition, the cushion for absorbing the impact at the time of falling may be attached to the side of the vehicle 130 (for example, the end on the vehicle front side) instead of or with installation on the ground surface 154. The attachment of the cushion to the vehicle 130 can be performed, for example, by an operator prior to the execution of the storage posture formation process.

The support 146 is provided for supporting a plurality of vehicles 130 in an inverted state at the storage location 144, and is a wall of the storage facility 140 as an example. More specifically, the inverted state mentioned here corresponds to a state in which the vehicle 130 stands as a result of standing the top plate 132 while bringing the end portion on the vehicle front side into contact with the floor surface (i.e., upper surface of the cushion 156) as in the vehicles 130A and 130B illustrated in FIG. 13.

Each vehicle 130 takes the storage posture according to the third embodiment at the storage location 144. Specifically, in the example shown in FIG. 13, the vehicle 130A, which arrived at the storage facility 140 earliest, is leaning against the support 146. The vehicle 130B, which arrived at the storage facility 140 second, is leaning against the support 146 via the vehicle 130A. In this storage posture, the vehicle 130A and the vehicle 130B are in a state of being overlapped with each other (i.e., the superposition state) in a plan view.

Then, the vehicle 130C, which arrived at the storage facility 140 third, will lean against the support 146 via the vehicles 130A and 130B after falling from the state shown in FIG. 13. As a result, the three vehicles 130A to 130C including the vehicle 130C are in the storage posture.

More specifically, the movement of the mobile platform 142 at the time of storage of a plurality of vehicles 130 can be performed, for example, by using an actuator (not shown) that can drive the mobile platform 142. Alternatively, the movement of the mobile platform 142 may be performed by an operator pushing on the mobile platform 142. In these examples, the position of the mobile platform 142 is shifted by the actuator or human power so as to be separated from the support 146 by a predetermined distance each time one vehicle 130 falls into the storage location 144.

Furthermore, the movement of the mobile platform 142 may be performed automatically by using the fall of the vehicle 130 from the mobile platform 142. Specifically, the mobile platform 142 may be configured to be pushed and moved by a falling vehicle 130 when the vehicle 130 falls into the gap between the support 146 or a counterpart vehicle 130 that has fallen earlier, and the mobile platform 142 (more specifically, falling section 150).

Additionally, in order for each vehicle 130 to take the storage posture according to the third embodiment, various adjustment factors, such as the position of the center of gravity of the vehicle 130, the shape of the falling section 150, the speed of the vehicle 130 immediately before the fall, and the falling position of the vehicle 130 with respect to the support 146, are appropriately determined in advance. This makes it possible for the vehicle 130 to properly lean on the support 146 or the vehicle 130 that has fallen earlier after falling from the mobile platform 142.

3-2. Effect

According to the automatic traveling vehicle 130 according to the third embodiment described above, when the storage execution condition is satisfied, the storage mode is executed, and the vehicle 130 performs the automatic traveling in order to take the storage posture as shown in FIG. 13. More specifically, each vehicle 130 can take the storage posture by automatically traveling so as to fall from the falling section 150 to the storage location 144 after climbing on the mobile platform 142. According to the storage posture shown in FIG. 13, the plurality of vehicles 130 are placed in an inverted state, and overlap each other in a plan view. Therefore, it is possible to effectively reduce the space in the arrangement direction (see FIG. 13) at the time of storage.

As described above, according to the automatic traveling vehicle 130 of the third embodiment, the vehicle 130 that has automatically traveled by the storage posture formation process can take the storage posture in an inverted state by using the mobile platform 142, the storage location 144, and the support 146. As a result, the automatic traveling vehicle 130 can also reduce the storage space by using the automatic traveling function.

Furthermore, according to the third embodiment, it is possible to lean a plurality of vehicles 130 against the support 146 so as to be overlapped in a plan view while eliminating the need for an operator himself/herself to lean the automatic traveling vehicle 130, which is a heavy object, against the support 146.

3-3. Another Example of Storage Posture Using Mobile Platform

Figure 15:
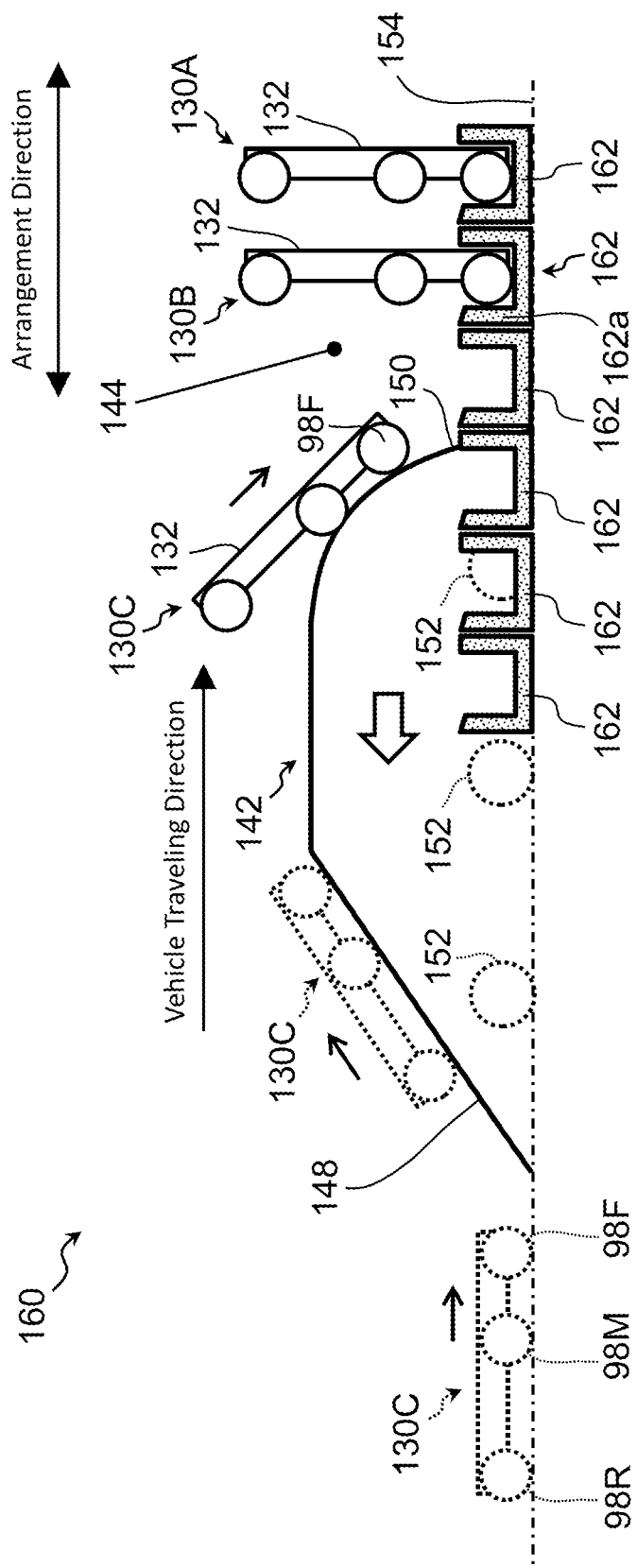
FIG. 15 is a diagram showing a configuration of a storage facility in a modified example according to the third embodiment as viewed from a lateral direction of the automatic traveling vehicle.

FIG. 15 is a diagram showing the configuration of a storage facility 160 in a modified example according to the third embodiment as viewed from the lateral direction of the automatic traveling vehicle 130. This storage facility 160 is different from the automatic traveling vehicle 130 according to the third embodiment in the configuration of the support.

The storage facility 160 includes supports 162. As shown in FIG. 15, each of the supports 162 has a rectangular parallelepiped shape with an open upper surface (in other words, a rail shape). The support 162 is installed for each vehicle 130. Then, in order to support (or clamp) the distal end portion of each vehicle 130 (for example, the end portion on the vehicle front side) that falls in order from the mobile platform 142, a predetermined number of supports 162 are installed side by side along the vehicle traveling direction (i.e., the "arrangement direction" in which a plurality of vehicles 130 are arranged). In addition, each support 162 has a width equivalent to the width of the vehicle 130 in the vehicle left-right direction.

According to the storage facility 160 including the above-described supports 162 together with the mobile platform 142, the plurality of vehicles 130 can take a storage posture as follows. That is, every time the vehicle 130 falls from the mobile platform 142 by automatically traveling according to the storage posture formation process, the mobile platform 142 is moved to the rear side in the arrangement direction by the width of one support 162. As a result, the vehicles 130 that have fallen from the mobile platform 142 are sequentially supported (clamped) by the respective supports 162 in an inverted state.

Then, in the inverted state obtained by using the supports 162, a plurality of vehicles 130 are lined up in a row with the top plate 132 standing upright and facing each other so as to be parallel to or substantially parallel to the vertical direction. More specifically, a plurality of vehicles 130 are arranged such that the upper surface of the top plate 132 of one vehicle 130 (vehicle 130B in FIG. 15) faces the bottom surface of the counterpart vehicle 130 (vehicle 130A in FIG. 15). In this kind of storage posture, the "parallel state" according to the present disclosure is obtained. In this parallel state, when compared with the other examples described above, it is possible to most effectively reduce the space in the arrangement direction during storage.

Furthermore, according to the storage facility 160 of the modified example, by arranging the supports 162 side by side as shown in FIG. 15, it is possible to naturally arrange the vehicles 130 side by side.

Additionally, the supports 162 may be configured such that a side surface portion 162a on the rear side (i.e., on the left side of the paper surface in FIG. 15) in the arrangement direction can slide downward (i.e., on the lower side of the paper surface in FIG. 15). As a result, the operation of removing the vehicle 130 from the support 162 can be facilitated. For the same purpose, the support 162 may have, for example, a structure capable of tilting the side surface portion 162a to the rear side in the arrangement direction (i.e., on the left side of the paper surface in FIG. 15).

What is claimed is:

1. An automatic traveling vehicle, comprising:
a vehicle structure including a first top plate having an upper surface configured for a user to ride on or for a luggage to be placed on, the vehicle structure includes a frame configured to support the first top plate, the frame is formed such that one end of the frame in a vehicle front-rear direction opens in a plan view and a width of the frame in a vehicle left-right direction is narrower toward a side of a remaining end of the frame in the vehicle front-rear direction; and
one or more electronic control units configured to execute automatic travel control of the automatic traveling vehicle, wherein the one or more electronic control units are configured to execute a storage mode being one of modes of the automatic travel control when a storage execution condition for moving the automatic traveling vehicle to a storage facility is satisfied, the storage mode includes a storage posture formation process of causing the automatic traveling vehicle to automatically travel so as to take a predetermined storage posture in the storage facility together with one or more other automatic traveling vehicles having a same configuration as the automatic traveling vehicle, in the storage posture, the automatic traveling vehicle is in a superposition state in which the automatic traveling vehicle overlaps with the one or more other automatic traveling vehicles in a plan view, or a parallel state in which the automatic traveling vehicle is lined up with the one or more other automatic traveling vehicles while the first top plate and a second top plate are standing and facing each other so as to be parallel to or substantially parallel to a vertical direction, the second top plate being included in each of the one or more other automatic traveling vehicles, in the storage posture formation process, the one or more electronic control units are configured to cause the automatic traveling vehicle to automatically travel such that the frame of the automatic traveling vehicle is inserted into an opening of a frame of one of the one or more other automatic traveling vehicles, and in the storage posture, the automatic traveling vehicle is in the superposition state.

2. The automatic traveling vehicle according to claim 1, wherein
the first top plate of the automatic traveling vehicle is configured to be rotatable around a rotation shaft provided on a side of the remaining end such that the side of the one end is lifted.

3. The automatic traveling vehicle according to claim 1, wherein
the storage execution condition is satisfied when a task of the automatic traveling vehicle disappears.

4. The automatic traveling vehicle according to claim 1, further comprising:
one or more electric motors for vehicle traveling; and
a power storage device configured to supply electric power to the one or more electric motors, wherein
the storage execution condition is satisfied when a charge rate of the power storage device drops to or below a threshold value or when it is time to charge the power storage device.

5. The automatic traveling vehicle according to claim 1, wherein
the storage execution condition is satisfied when an automatic traveling function of the automatic traveling vehicle is not impaired but a failure occurs in the automatic traveling vehicle.

6. An automatic traveling vehicle, according to claim 1, comprising:
a vehicle structure including a first top plate having an upper surface configured for a user to ride on or for a luggage to be placed on;
a slope; and
one or more electronic control units configured to execute automatic travel control of the automatic traveling vehicle, wherein
the one or more electronic control units are configured to execute a storage mode being one of modes of the automatic travel control when a storage execution condition for moving the automatic traveling vehicle to a storage facility is satisfied, the storage mode includes a storage posture formation process of causing the automatic traveling vehicle to automatically travel so as to take a predetermined storage posture in the storage facility together with one or more other automatic traveling vehicles having a same configuration as the automatic traveling vehicle, in the storage posture, the automatic traveling vehicle is in a superposition state in which the automatic traveling vehicle overlaps with the one or more other automatic traveling vehicles in a plan view, or a parallel state in which the automatic traveling vehicle is lined up with the one or more other automatic traveling vehicles while the first top plate and a second top plate are standing and facing each other so as to be parallel to or substantially parallel to a vertical direction, the second top plate being included in each of the one or more other automatic traveling vehicles, the slope is formed so as to extend from one end of the first top plate in a vehicle front-rear direction and configured to guide one of the one or more other automatic traveling vehicles so as to ride on the first top plate, and in the storage posture, the automatic traveling vehicle is in the superposition state in cooperation with one of the one or more other automatic traveling vehicles riding on the first top plate.

7. The automatic traveling vehicle according to claim 6, further comprising an instrument or device foldably installed on the upper surface of the first top plate, wherein
the upper surface of the first top plate includes a storage groove formed to store the instrument or device.

8. The automatic traveling vehicle according to claim 6, wherein
the first top plate includes one or more guide grooves formed so as to guide one of the one or more other automatic traveling vehicles riding on the first top plate by using the slope.

9. A storage facility that stores a plurality of automatic traveling vehicles, each of the plurality automatic traveling vehicles includes a vehicle structure including a first top plate having an upper surface configured for a user to ride on or for a luggage to be placed on; and
one or more electronic control units configured to execute automatic travel control of the automatic traveling vehicle, wherein
the one or more electronic control units are configured to execute a storage mode being one of modes of the automatic travel control when a storage execution condition for moving the automatic traveling vehicle to a storage facility is satisfied, the storage mode includes a storage posture formation process of causing the automatic traveling vehicle to automatically travel so as to take a predetermined storage posture in the storage facility together with one or more other automatic traveling vehicles having a same configuration as the automatic traveling vehicle, in the storage posture, the automatic traveling vehicle is in a superposition state in which the automatic traveling vehicle overlaps with the one or more other automatic traveling vehicles in a plan view, or a parallel state in which the automatic traveling vehicle is lined up with the one or more other automatic traveling vehicles while the first top plate and a second top plate are standing and facing each other so as to be parallel to or substantially parallel to a vertical direction, the second top plate being included in each of the one or more other automatic traveling vehicles, the storage facility comprising:

a mobile platform including a climbing section where the automatic traveling vehicle that is automatically traveling by the storage posture formation process climbs, and a falling section located in front of the climbing section in a traveling direction of the automatic traveling vehicle and formed to drop the automatic traveling vehicle, the mobile platform being configured to be movable in a direction parallel to the traveling direction;

a storage location where the plurality of automatic traveling vehicles after falling in order from the falling section are arranged side by side in a direction parallel to the traveling direction in an inverted state; and one or more supports configured to support the plurality of automatic traveling vehicles in the inverted state, wherein the plurality of automatic traveling vehicles take the storage posture in the superposition state or the parallel state at the storage location.

10. The storage facility according to claim 9, wherein the storage execution condition is satisfied when a task of the automatic traveling vehicle disappears.

11. The storage facility according to claim 9, wherein each of the plurality of the automatic traveling vehicles further includes:

one or more electric motors for vehicle traveling; and a power storage device configured to supply electric power to the one or more electric motors, wherein the storage execution condition is satisfied when a charge rate of the power storage device drops to or below a threshold value or when it is time to charge the power storage device.

12. The storage facility according to claim 9, wherein the storage execution condition is satisfied when an automatic traveling function of one or more of the plurality of the automatic traveling vehicles are not impaired but a failure occurs in the one or more of the plurality of the automatic traveling vehicles.

* * * * *

UNITED STATES PATENT AND TRADEMARK OFFICE
CERTIFICATE OF CORRECTION

PATENT NO. : 11,927,958 B2
APPLICATION NO. : 17/486063
DATED : March 12, 2024
INVENTOR(S) : Yuta Maniwa et al.

It is certified that error appears in the above-identified patent and that said Letters Patent is hereby corrected as shown below:

In the Claims

In Claim 6, Line 1 (Column 19, Line 56), delete "according to claim 1,".

Signed and Sealed this
Twenty-eighth Day of May, 2024

Katherine Kelly Vidal
*Director of the United States Patent and Trademark Office*